US010809232B2

United States Patent
Sasaki et al.

(10) Patent No.: US 10,809,232 B2
(45) Date of Patent: Oct. 20, 2020

(54) OPTICAL FIBER ELECTROMAGNETIC ACOUSTIC TRANSDUCER PIPE INSPECTING APPARTUS AND METHOD

(71) Applicant: Kabushiki Kaisha Toshiba, Minato-ku (JP)

(72) Inventors: Keiichi Sasaki, Setagaya (JP); Daisuke Asakura, Kawasaki (JP); Hiroaki Cho, Fuchu (JP); Tetsuo Endoh, Fujisawa (JP); Shohei Matsumoto, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 214 days.

(21) Appl. No.: 14/820,677

(22) Filed: Aug. 7, 2015

(65) Prior Publication Data
US 2016/0109410 A1 Apr. 21, 2016

(30) Foreign Application Priority Data

Oct. 17, 2014 (JP) .................................. 2014-212767
May 21, 2015 (JP) .................................. 2015-103725

(51) Int. Cl.
*G01N 29/04* (2006.01)
*G01N 29/24* (2006.01)
(Continued)

(52) U.S. Cl.
CPC ........... *G01N 29/043* (2013.01); *G01B 17/02* (2013.01); *G01N 29/11* (2013.01);
(Continued)

(58) Field of Classification Search
CPC ...... G01N 29/043; G01N 29/11; G01N 29/07; G01N 29/2418; G01N 29/2475;
(Continued)

(56) References Cited

U.S. PATENT DOCUMENTS 5,811,682 A * 9/1998 Ohtani ...................... B06B 1/04
 73/622
7,117,742 B2 * 10/2006 Kim ........................ G01H 9/004
 73/587
(Continued)

FOREIGN PATENT DOCUMENTS

JP 2003-130854 A 5/2003
JP 2005-10055 A 1/2005
(Continued)

OTHER PUBLICATIONS

Roberts, Inspection of Buried or Inaccessable Piping in Nuclear Power Plants Utilizing Ultrasonic Based Intelligent Pigging Technology, 2013.*
(Continued)

*Primary Examiner* — David L Singer
(74) *Attorney, Agent, or Firm* — Oblon, McClelland, Maier & Neustadt, L.L.P.

(57) ABSTRACT

In one embodiment, a pipe inspecting apparatus includes a selection module configured to select first and second ultrasonic optical probes from a plurality of ultrasonic optical probes attached to a pipe. The apparatus further includes a power supplying module configured to supply power to an ultrasonic transducer of the first ultrasonic optical probe to input an ultrasonic wave from the ultrasonic transducer to the pipe and to supply the ultrasonic wave via the pipe to an optical fiber sensor of the second ultrasonic optical probe. The apparatus further includes a light detection module configured to detect laser light transmitted through the optical fiber sensor of the second ultrasonic optical probe.

10 Claims, 16 Drawing Sheets

(51) Int. Cl.
  *G01B 17/02* (2006.01)
  *G01N 29/11* (2006.01)
  *G21C 17/017* (2006.01)
(52) U.S. Cl.
  CPC ..... *G01N 29/2412* (2013.01); *G01N 29/2418* (2013.01); *G01N 29/2475* (2013.01); *G01N 2291/0258* (2013.01); *G01N 2291/02854* (2013.01); *G01N 2291/044* (2013.01); *G01N 2291/2634* (2013.01); *G21C 17/017* (2013.01)
(58) Field of Classification Search
  CPC ... B06B 1/04; B06B 1/08; B06B 1/085; F16L 2101/30; G01B 17/02; G21C 17/017
  USPC ......... 73/643, 668, 592, 600, 622, 597, 598, 73/599, 865.8; 702/39
  See application file for complete search history.

(56) References Cited

U.S. PATENT DOCUMENTS

| | | | |
|---|---|---|---|
| 7,176,448 B2* | 2/2007 | Ogisu | G01M 11/086 250/227.14 |
| 2005/0075846 A1* | 4/2005 | Kim | G01H 9/004 703/1 |
| 2005/0120803 A1* | 6/2005 | Sokol | G01N 29/2412 73/801 |
| 2005/0209791 A1* | 9/2005 | Senibi | G01N 29/041 702/33 |
| 2006/0079747 A1* | 4/2006 | Beard | G01N 29/043 600/407 |
| 2007/0012112 A1* | 1/2007 | Kim | G01H 9/004 73/594 |
| 2008/0011086 A1* | 1/2008 | Kim | G01N 29/0609 73/632 |
| 2008/0225376 A1* | 9/2008 | Kim | G01N 29/043 359/287 |
| 2008/0260324 A1 | 10/2008 | Takahashi et al. | |
| 2009/0157358 A1* | 6/2009 | Kim | G01L 1/16 702/185 |
| 2009/0192729 A1* | 7/2009 | Pado | G01N 29/043 702/36 |
| 2010/0131246 A1* | 5/2010 | Volker | G01B 17/08 703/1 |
| 2013/0197846 A1* | 8/2013 | Kuroda | G01B 17/02 702/97 |
| 2013/0327148 A1* | 12/2013 | Yan | G01N 29/34 73/628 |
| 2014/0190264 A1* | 7/2014 | Barshinger | G01N 29/04 73/592 |

FOREIGN PATENT DOCUMENTS

| | | | |
|---|---|---|---|
| JP | 2005-98921 | | 4/2005 |
| JP | 2005-241298 | | 9/2005 |
| JP | 2007-611741 | | 5/2007 |
| JP | 2008-281559 A | | 11/2008 |
| JP | 2010-071741 A | | 4/2010 |
| JP | 2011007689 A | * | 1/2011 |
| JP | 2012122751 A | * | 6/2012 |
| JP | 2013072735 A | * | 4/2013 |
| JP | 2014-102157 A | | 6/2014 |
| SU | 991285 A1 | * | 1/1983 |
| WO | WO 2014/035564 A1 | | 3/2014 |

OTHER PUBLICATIONS

Leonard, Lamb wave tomography of pipe-like structures, Ultrasonics 43 (2005) 574-583.*
Machine Translation of SU991285.*
Extended European Search Report dated Jun. 24, 2016 in Patent Application No. 15180434.1.
Office Action dated Mar. 14, 2016 in European Patent Application No. 15 180 434.1.
Office Action dated Aug. 18, 2016 in Korean Patent Application No. 10-2015-0124928 (with English translation).
Hui'en Zhang, "Textbook for Common High Education of the 12th Five-year Plan Noise and Vibration Control", Metallurgy Industry Press, Beijing, p. 44 and Figs. 3-9, 5 pages (w/English translation).

* cited by examiner

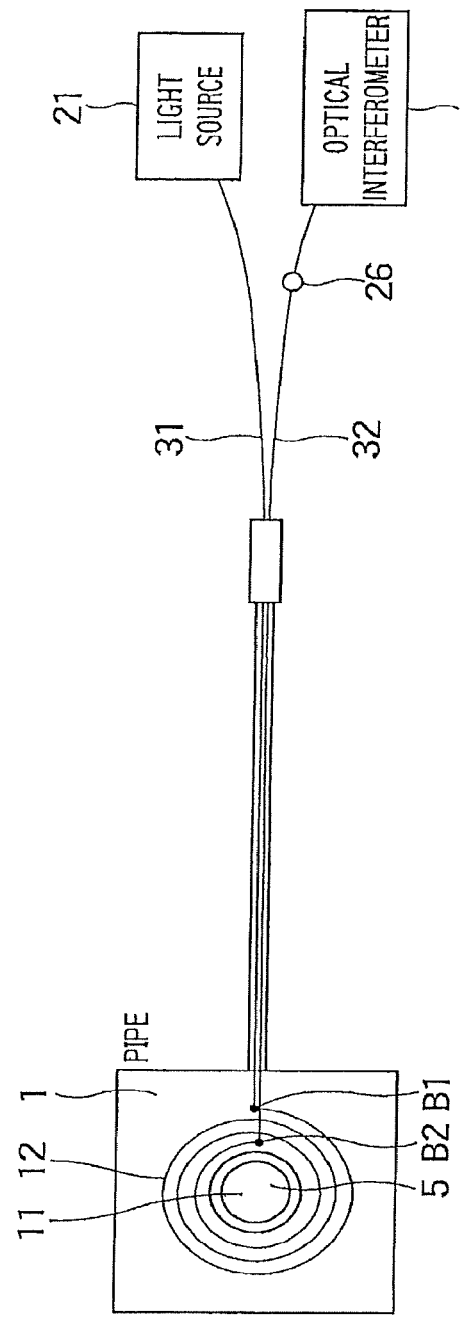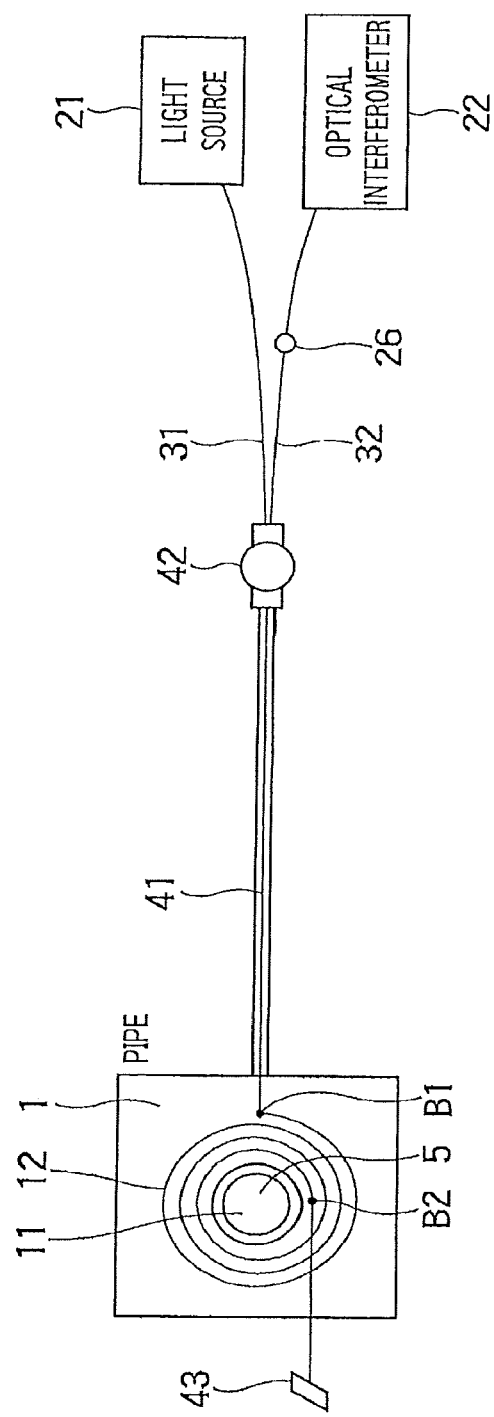
FIG. 10A
FIG. 10B

(12) United States Patent
US 10,809,232 B2

OPTICAL FIBER ELECTROMAGNETIC ACOUSTIC TRANSDUCER PIPE INSPECTING APPARTUS AND METHOD

CROSS REFERENCE TO RELATED APPLICATIONS

This application is based upon and claims the benefit of priority from the prior Japanese Patent Applications No. 2014-212767, filed on Oct. 17, 2014 and No. 2015-103725, filed on May 21, 2015, the entire contents of which are incorporated herein by reference.

FIELD

Embodiments described herein relate to a pipe inspecting apparatus and a pipe inspecting method.

BACKGROUND

Inspection of pipe wall thinning and pipe corrosion is conducted, for example, by way of an ultrasonic testing method. The ultrasonic testing method is performed in such a way that a probe for sending and receiving ultrasonic waves is brought into contact with a surface of a test piece to propagate ultrasonic waves of various frequencies inside the test piece. Then, the ultrasonic waves (echoes) which are reflected on a flaw inside the test piece or a rear surface of the test piece and returned therefrom are received such that a state inside the test piece can be grasped. A position of the flaw may be measured by use of a time period required from sending to receiving of the ultrasonic waves, and a size of the flaw may be measured by use an intensity of the received echo or by measuring a range where a flaw echo appears.

An inspection method by use of the ultrasonic waves is used in an atomic power plant to measure a plate thickness of a material or to detect a weld defect in a lamination or the like. Moreover, also in inspecting a weld surfacing portion for reinforcing a nozzle opening, branch, and pipe joint around a nuclear reactor pressure vessel, the inspection method by use of the ultrasonic waves is used.

In the power generating plant, the wall thinning tends to be likely to be caused by flow accelerated corrosion (FAC) or erosion in a pipe at an elbow portion or a downstream side of an orifice portion. Based on such a knowledge, the rules on pipe wall thinning management (code for power generation facilities, JSME S CA1-2005) have been established by the Japan Society of Mechanical Engineers (JSME). According to the rules, pipe wall thinning management is practiced by pipe wall thickness measuring using an ultrasonic wall thickness measuring instrument. However, this technique which requires a heat insulating material covering the pipe to be disassembled and reconstructed every time measuring the wall thickness takes significant time and cost.

Therefore, in order to attain low cost wall thinning management, an embedded type sensor for fixed point measurement has been developed. For example, there has been known an optical fiber EMAT method using an ultrasonic optical probe which combines an electromagnetic acoustic transducer (EMAT) and an optical fiber sensor. The electromagnetic acoustic transducer is a resonator which excites ultrasonic waves in a pipe by an action of an electromagnetic force. The optical fiber sensor is a sensor for detecting a resonance wave of the excited ultrasonic waves by means of laser light. In the optical fiber EMAT method, a result of this laser light detection may be analyzed to obtain the wall thickness of the pipe and information about the flaw inside the pipe.

FIGS. 1A and 1B are perspective views illustrating a matrix fixed point method and a 3D-UT whole surface flaw detection method. FIG. 2 is a sectional view illustrating a pipe wall thinning phenomenon.

According to requirements of the wall thinning management rules by the JSME, a wall thickness of a pipe 1 may only be measured at matrix fixed points for detecting FAC of the pipe 1, as shown in FIG. 1A. FIG. 1A shows an elbow portion is of the pipe 1 having a size of 150 A or more. According to the pipe wall thinning rules by the JSME, in a case where the size of the pipe 1 is 150 A or more, a pitch between measuring points P in an axial direction is set to be a length of a pipe outer diameter or less, and the pipe 1 has eight measuring points P (45° pitch) provided in a circumferential direction per circumference. The wall thickness of the pipe 1 is measured by bring a plate thickness sensor 3 into contact with the measuring point P.

However, in the pipe 1 in an actual power generating plant, not only a FAC 4 but also a pinhole-shaped local wall thinning, called a liquid droplet impingement erosion (LDI) 2, occurs, as shown in FIG. 2. FIG. 2 shows the elbow portion 1a located downstream from an orifice portion 1b. Such a LDI 2 may be possibly missed in a UT measurement only at the matrix fixed points.

Therefore, power producers have announced that a policy is added to a measurement guideline that the elbow portion 1a where the LDI 2 may occur with high possibility is subjected to wall thickness measurement by means of the UT whole surface flaw detection with no detection missing. The UT whole surface flaw detection may be conducted by the 3D-UT whole surface flaw detection method mechanically scanning by the plate thickness sensor 3 as shown in FIG. 1B by an arrow S. However, the 3D-UT whole surface flaw detection method takes a long time to arrange and adjust a scanning mechanism. For this reason, the pipe inspecting method is required which can easily conduct the whole surface flaw detection on the elbow portion is in a short time.

BRIEF DESCRIPTION OF THE DRAWINGS

FIGS. 10A and 10B are diagrams illustrating examples of configurations of an optical fiber sensor of the first embodiment;

DETAILED DESCRIPTION

Embodiments will now be explained with reference to the accompanying drawings.

In an optical fiber EMAT method, a plurality of ultrasonic optical probes are attached to a surface of a pipe 1 and wall thicknesses of the pipe 1 at each of arranged positions of these ultrasonic optical probes is measured. However, the optical fiber EMAT method of related art measures only a wall thickness of the pipe 1 immediately below an arranged position of the ultrasonic optical probe. Accordingly, the optical fiber EMAT method may possibly cause detection missing of an LDI 2 in the pipe 1. Therefore, a pipe inspecting method has been required in which a FAC 4 and the LDI 2 in the pipe 1 can be detected with high accuracy.

In one embodiment, a pipe inspecting apparatus includes a selection module configured to select first and second ultrasonic optical probes from a plurality of ultrasonic optical probes attached to a pipe. The apparatus further includes a power supplying module configured to supply power to an ultrasonic transducer of the first ultrasonic optical probe to input an ultrasonic wave from the ultrasonic transducer to the pipe and to supply the ultrasonic wave via the pipe to an optical fiber sensor of the second ultrasonic optical probe. The apparatus further includes a light detection module configured to detect laser light transmitted through the optical fiber sensor of the second ultrasonic optical probe.

First Embodiment

Figure 3:
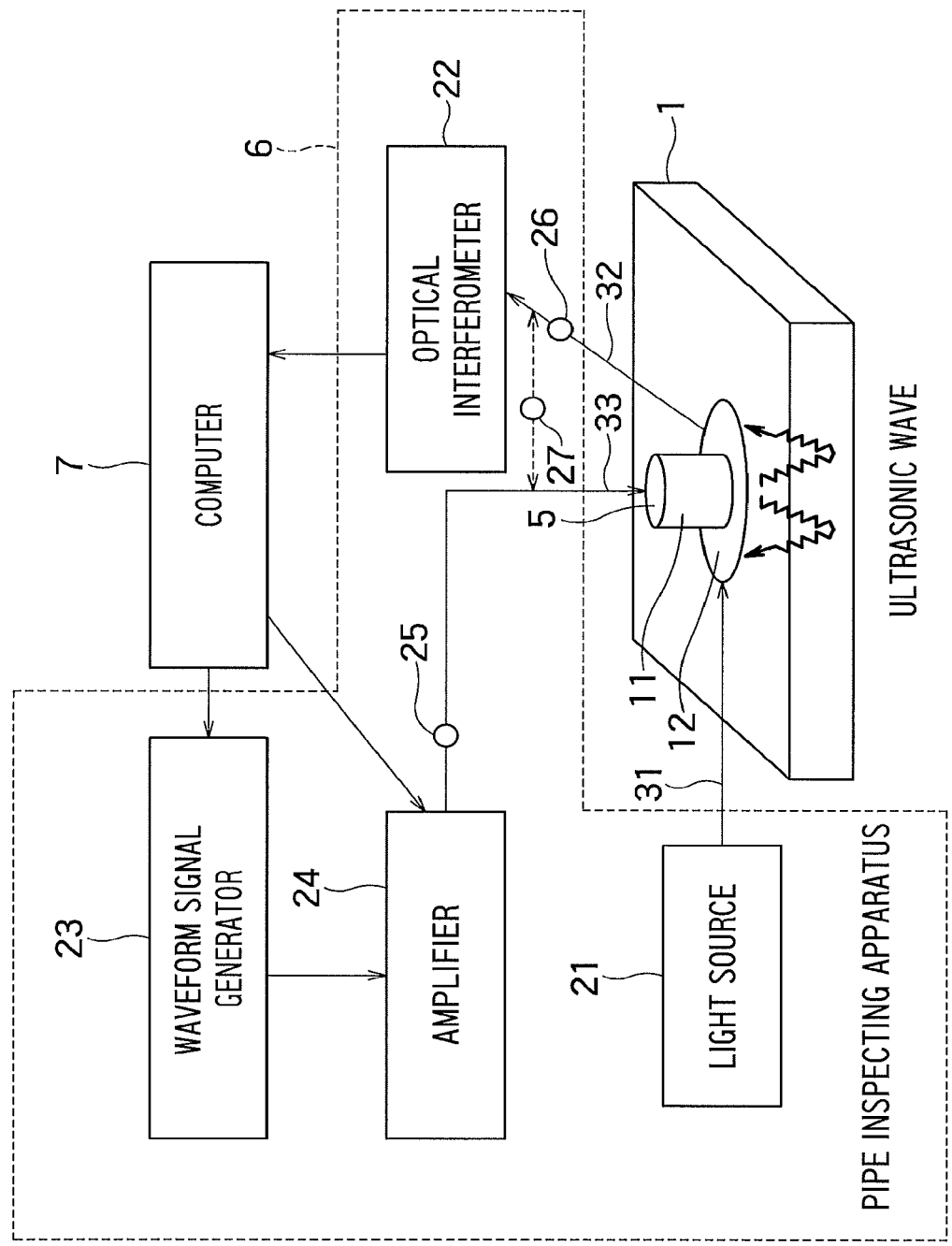
FIG. 3 is a schematic diagram showing a configuration of a pipe inspecting system of a first embodiment.

FIG. 3 is a schematic diagram showing a configuration of a pipe inspecting system of a first embodiment.

The pipe inspecting system in FIG. 3 includes a plurality of ultrasonic optical probes 5 attached to the surface of the pipe 1, a pipe inspecting apparatus 6, and a computer 7. FIG. 3 shows one of these ultrasonic optical probes 5. Examples of the pipe 1 include a pipe in an atomic power plant, thermal power plant and geothermal power plant, or a pipe constituting a pipe line and water pipe.

Each ultrasonic optical probe 5 includes an electromagnetic acoustic transducer (hereinafter, referred to as "EMAT") 11, and an optical fiber sensor 12. The pipe inspecting apparatus 6 includes a light source 21, an optical interferometer 22, a waveform signal generator 23, an amplifier 24, an electrical switch 25, a light switch 26, and a mode switch 27. The optical interferometer 22 is an example of a light detection module. The waveform signal generator 23 and the amplifier 24 are examples of a power supplying module. The electrical switch 25, the light switch 26, and the mode switch 27 are examples of a selection module. Also, the electrical switch 25 and the light switch 26 are examples of first and second switches, respectively.

The EMAT 11 is attached via the optical fiber sensor 12 to the pipe 1 and excites ultrasonic waves in the pipe 1 by an action of an electromagnetic force. The optical fiber sensor 12 in which a linear optical fiber is spirally wound (pyrethrum coil shaped) is formed into a circular flat plate having flexibility and is used to detect a resonance wave of the excited ultrasonic waves by means of laser light. The circular flat plate has a size similar to a Japanese five yen coin, for example.

The waveform signal generator 23 and the amplifier 24 generate and amplify a high-frequency current to supply to the EMAT 11 under control by the computer 7. This supplies the power to the EMAT 11. The light source 21 generates a reference laser light to supply to the optical fiber sensor 12. The optical interferometer 22 detects variation of the reference laser light transmitted through the optical fiber sensor 12.

The computer 7 has a diagnostic database having stored therein a determination threshold concerning deterioration of the pipe 1 such as corrosion, pipe wall thinning and the like of the pipe 1. The computer 7 compares with data in the diagnostic database a detection result of an original waveform received from the optical interferometer 22 and a processing result obtained by subjecting the original waveform to signal processing and determines a deterioration degree of the pipe 1.

The pipe inspecting system in FIG. 3 includes a first optical fiber 31, a second optical fiber 32, and a power source line 33. The first optical fiber 31 is used to transfer the laser light from the light source 21 to the optical fiber sensor 12 of each ultrasonic optical probe 5, and the second optical fiber 32 is used to transfer the laser light from the optical fiber sensor 12 of each ultrasonic optical probe 5 to the optical interferometer 22. The power source line 33 is used to supply the high-frequency current from the amplifier 24 to the EMAT 11 of each ultrasonic optical probe 5.

The pipe inspecting apparatus 6 includes the electrical switch 25 provided on the power source line 33, the light switch 26 provided on the second optical fiber 32, and the mode switch 27 connected with the first and second optical fibers 31 and 32. The light switch 26 may be provided on the first optical fiber 31 or may be provided on the first and second optical fibers 31 and 32.

The electrical switch 25 is used to select the ultrasonic optical probe 5 to be connected with the amplifier 24 from the plurality of ultrasonic optical probes 5. When the electrical switch 25 selects a certain ultrasonic optical probe 5, the amplifier 24 supplies the high-frequency current to the EMAT 11 of the selected ultrasonic optical probe 5. The electrical switch 25 in the present embodiment having 96 channels can control 96 ultrasonic optical probes 5.

The light switch 26 is used to select the ultrasonic optical probe 5 to be connected with the optical interferometer 22 from the plurality of ultrasonic optical probes 5. When the light switch 26 selects a certain ultrasonic optical probe 5, the optical fiber sensor 12 of the selected ultrasonic optical probe 5 supplies the laser light to the optical interferometer 22. The light switch 26 in the present embodiment having 32 channels can control 32 ultrasonic optical probes 5.

The mode switch 27 is used to switch between the ultrasonic optical probe 5 connected with the first and second optical fibers 31 and 32 double-lined and the ultrasonic optical probe 5 connected with the optical fiber 41 single-lined (FIGS. 10A and 10B). The mode switch 27 is described later in detail.

The electrical switch 25, light switch 26, and mode switch 27 in the present embodiment are controlled by the computer 7.

Figure 4:
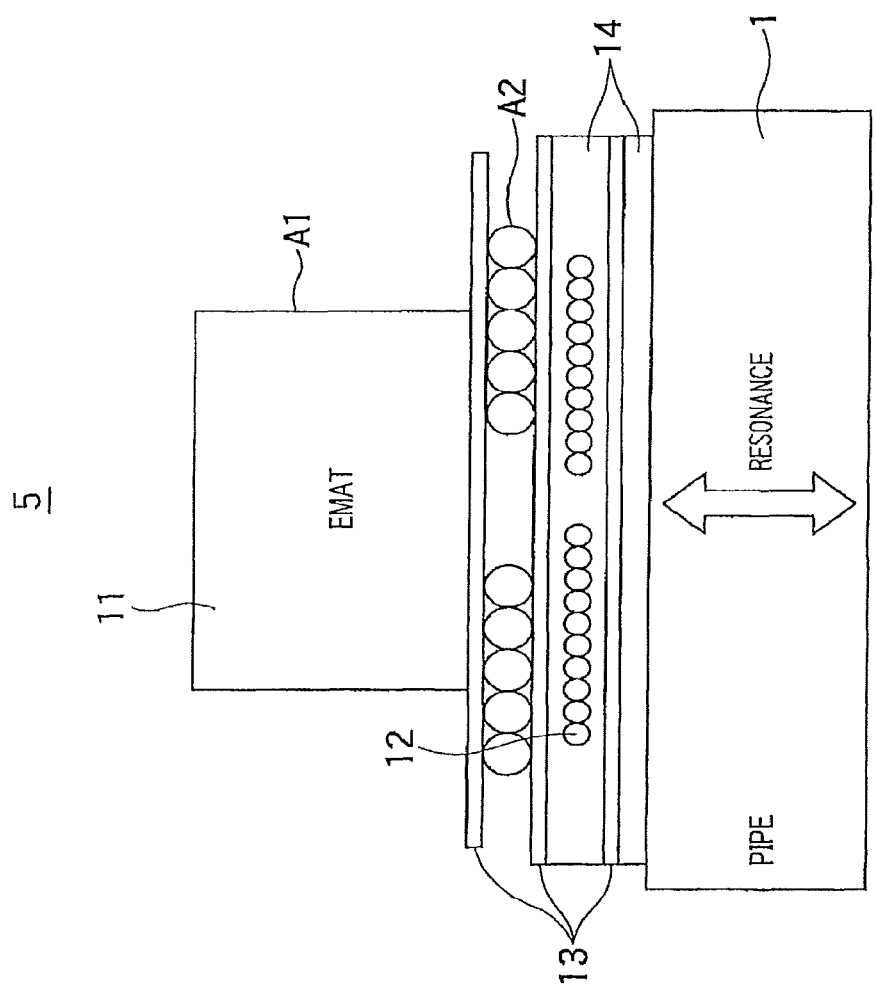
FIG. 4 is a schematic view showing a configuration of each ultrasonic optical probe of the first embodiment.

FIG. 4 is a schematic view showing a configuration of each ultrasonic optical probe 5 of the first embodiment.

The EMAT 11 includes a permanent magnet A1 and an electric coil A2. The permanent magnet A1 and the electric coil A2 are integrated via a resin sheet 13.

One of elements taking control of heat resistance and durability of the permanent magnet A1 is a material of the permanent magnet A1. Samarium cobalt is an example of the material of the permanent magnet A1 having good heat resistance. Since samarium cobalt has a demagnetization point between 350° C. and 400° C., if the samarium cobalt permanent magnet A1 is used at a high temperature, it is desirably used at 350° C. or less.

From a viewpoint that cobalt is considered to be a rare metal, the permanent magnet A1 using a substitute material for cobalt has begun to be developed. For example, the permanent magnet A1 of samarium-iron system (Sm—Fe—N system or the like) has been produced as a bond magnet on a commercial basis. Use of a sintered magnet of the samarium-iron system as the permanent magnet A1 for performing the optical fiber EMAT method that is a high temperature application can attain more inexpensive and more environment-friendly ultrasonic optical probe 5.

The electric coil A2 is supplied with the high-frequency current from the amplifier 24. This results in that a Lorentz force generated by electromagnetic induction in the electric coil A2 and magnetostriction excite the ultrasonic waves in the pipe 1. The high-frequency current is adjusted so as to have a predetermined frequency and amplitude by the waveform signal generator 23 and amplifier 24 controlled by the computer 7. The electric coil A2 is wound in an annular shape to be formed into a circular flat plate.

The optical fiber sensor 12 is integrated with the EMAT 11 by means of the resin sheet 13 and an adhesive 14. The ultrasonic optical probe 5 is adhered to the pipe 1 to be measured by the adhesive 14

When the ultrasonic waves are input to the pipe 1 from the EMAT 11, a part of the ultrasonic waves reaches the optical fiber sensor 12. Here, in a state where the reference laser light from the light source 21 is input to the optical fiber sensor 12, when the ultrasonic wave reaches the optical fiber sensor 12, the optical fiber sensor 12 slightly extends and contracts by an effect of the ultrasonic wave to cause a Doppler frequency shift and polarization plane variation in the reference laser light.

The optical interferometer 22 photoelectric-converts and measures the reference laser light transmitted through the optical fiber sensor 12 to detect such variations. In this way, the optical interferometer 22 can detect a resonant state in a wall thickness direction of the ultrasonic wave by way of detecting the reference laser light. The computer 7 can determine a state of the pipe 1 based on a detection result of the reference laser light by the optical interferometer 22.

In this way, the ultrasonic waves input from the EMAT 11 to the pipe 1 are supplied via the pipe 1 to the optical fiber sensor 12.

At this time, the pipe inspecting system in the present embodiment can supply the ultrasonic waves from the EMAT 11 to the optical fiber sensor 12 of an identical ultrasonic optical probe 5 to detect the reference laser light transmitted through this optical fiber sensor 12 by the optical interferometer 22. In this case, the electrical switch 25 and the light switch 26 select the identical ultrasonic optical probe 5. The computer 7 can determine the state of the pipe 1 immediately below the arranged position of this ultrasonic optical probe 5 based on the detection result of this reference laser light.

On the other hand, the pipe inspecting system in the present embodiment can also supply the ultrasonic waves from the EMAT 11 to the optical fiber sensors 12 of different ultrasonic optical probes 5 to detect the reference laser light transmitted through these optical fiber sensors 12 by the optical interferometer 22. In this case, the electrical switch 25 and the light switch 26 select the different ultrasonic optical probes 5. The ultrasonic optical probe 5 selected by the electrical switch 25 is an example of a first ultrasonic optical probe and the ultrasonic optical probe 5 selected by the light switch 26 is an example of a second ultrasonic optical probe. The computer 7 can detect the state of the pipe 1 at a location other than the arranged positions of these ultrasonic optical probes 5 based on the detection result of the reference laser light. This process is described later in detail.

Even if the ultrasonic optical probe 5 has a simple shape of the EMAT 11 as shown in FIG. 4, a sufficient signal strength is obtained in terms of wall thickness measurement. Examples of a factor relating to accuracy and sensitivity of the wall thickness measurement include a resonant power of the EMAT 11 and an adhesion degree of the optical fiber sensor 12 with respect to the pipe 1. Therefore, a magnetic force of the permanent magnet A1 under high temperature and reliability (durability) of a joining portion between the optical fiber sensor 12 and the pipe 1 are important.

As to the magnetic force of the permanent magnet A1, there is a method in which a heat resistant permanent magnet A1 for high temperature is used and plated to prevent the permanent magnet A1 from oxidation. The plated permanent magnet A1 for high temperature and a polyimide-coated electric coil A2 can be used to maintain the resonant power of the EMAT 11 even under high temperature.

On the other hand, examples of a method for joining the optical fiber sensor 12 and the pipe 1 include adhesion by a high-temperature adhesive, thermal spray and the like. The optical fiber sensor 12 is desirably arranged in close contact with the surface of the pipe 1 so as to fit a surface shape and curvature of the pipe 1, and is fixed to the surface of the pipe 1 by the adhesion and the thermal spray. At this time, the optical fiber sensor 12 and the pipe 1 may be brought into close contact with each other directly or via an indirect material such as a flexible sheet. In the latter case, higher joining strength enables the reliability such as the heat resistance and the durability to be improved over a long period of time, and ease of construction enables joining by use of inexpensive materials.

In a case of adhering a polyimide-coated optical fiber sensor 12, a polyimide based adhesive has a high long-time reliability, and an epoxy based or silicon based adhesive tends to relatively readily deteriorate. When the polyimide-coated optical fiber sensor 12 is joined to a metal pipe 1, the polyimide based adhesive is desirably used for adhesion through a vacuum impregnation method.

In the vacuum impregnation method, first the optical fiber sensor 12 is inserted between glass cloths impregnated with the adhesive. Next, this is vacuum-packed together with a plane heater or a rubber heater on the surface of the pipe 1 and pressed under an atmospheric pressure while being heated and cured in a predetermined way by a heater temperature regulator. Next, after curing and adhesion, a release film, a breather, a pack film and the like are removed from a surface of the glass cloth.

The optical fiber sensor 12 may be produced in a following procedure. First, a heat resistant coated fiber is spirally wound. Next, the spirally wound heat resistant coated fiber is fixed on a flexible sheet made of heat resistant materials such as polyimide by use of a polyimide varnish. The optical fiber sensor 12 may be inserted together with the flexible sheet between the glass cloths impregnated with the adhesive or directly inserted between the glass cloths.

Instead of the polyimide based adhesive, a metal powder-containing ceramics based adhesive may be used. Some metal powder-containing ceramics based adhesives have been confirmed to have good workability and durability. In case of using such an adhesive, if the adhesive is simply applied to the optical fiber sensor 12 to be maintained on the surface of the pipe 1 and the adhesive is cured at an ambient temperature, sufficient joining strength can be obtained. In this case, the glass cloth may be or may not be inserted between the optical fiber sensor 12 and the pipe 1.

Figure 5:
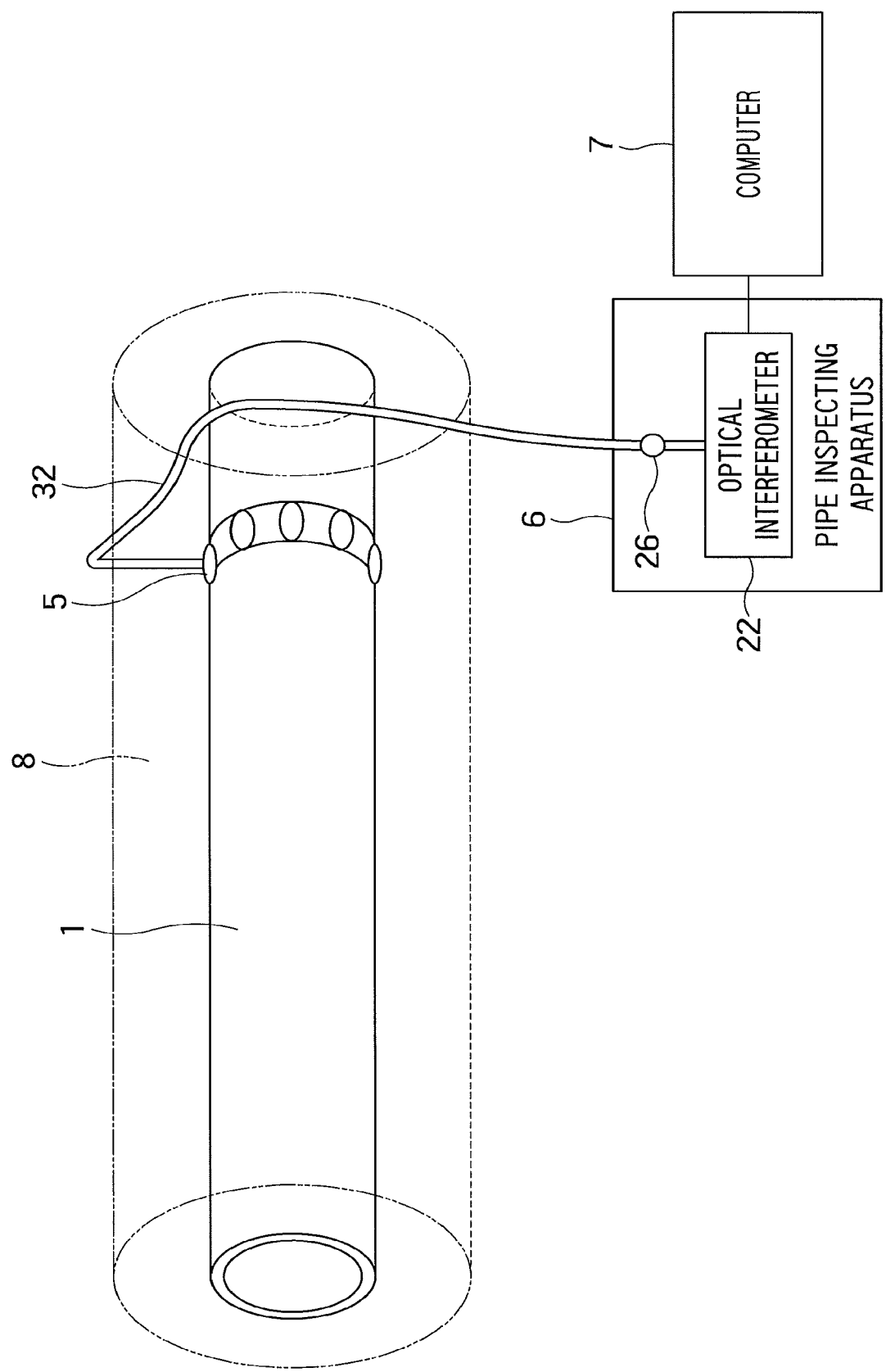
FIG. 5 is a schematic view showing an example for attaching ultrasonic optical probes to a pipe in the first embodiment.

FIG. 5 is a schematic view showing an example for attaching the ultrasonic optical probes 5 to the pipe 1 in the first embodiment.

In the present embodiment, the plurality of ultrasonic optical probes 5 are attached to an outer surface of the pipe 1, and resonant ultrasonic signals multiply-reflected from an inner surface and outer surface of the pipe 1 are analyzed by the computer 7 to measure the wall thickness of the pipe 1. A material of the pipe 1 is, for example, carbon steel. In the present embodiment, the ultrasonic optical probe 5 is embedded in advance between the pipe 1 and the heat insulating material (heat retaining material) 8 such that the wall thickness measurement (deterioration degree determination) can be performed online. According to the present embodiment, the heat insulating material 8 is not required to be disassembled and reconstructed every time measuring the wall thickness, enhancing safety and capacity utilization of the power generating plant.

The pipe wall thinning management rules specify a position of a wall thickness measuring point of the pipe 1 depending on a diameter of the pipe 1. If a size of the pipe 1 is 150 A (outer diameter: about 165 mm) or more, eight positions (at an interval of) 45° are specified in a circumferential direction of the pipe 1. If the size of the pipe 1 is less than 150 A, four positions are specified in the circumferential direction of the pipe 1 (at an interval of 90°). FIG. 5 shows the former case. It is specified that the wall thickness measuring points of the pipe 1 in an axial direction of the pipe 1 are set at an interval of a length of the outer diameter of the pipe 1 or less.

A description is given of a method for measuring the wall thickness of the pipe 1 by use of these ultrasonic optical probes 5.

The electric coil A2 in the EMAT 11 vibrates the pipe 1 to generate the ultrasonic waves in the pipe 1 when the high-frequency current flows in the coil A2. At this time, the computer 7 varies a frequency of the high-frequency current through the waveform signal generator 23 to sweep a frequency of the ultrasonic wave in a desired frequency range.

The ultrasonic wave in the pipe 1 is propagated to the optical fiber sensor 12. When the ultrasonic wave reaches the optical fiber sensor 12 in a state where the reference laser light is input to the optical fiber sensor 12, the Doppler frequency shift and the polarization plane variation are caused in the reference laser light. A value of this variable (extending and contracting speed) is converted into a voltage value through the photoelectric conversion by the optical interferometer 22 such that the frequency of the ultrasonic wave propagating in the pipe 1 can be measured.

When a relationship between a wall thickness d of the pipe 1 and a wavelength λ of the ultrasonic wave in the pipe 1 satisfies λ=2d, an incident wave and reflected wave of the ultrasonic wave resonate and an amplitude of a composite wave is increased. This relationship can be represented as f=v/2d by use of a frequency f and acoustic velocity v of the ultrasonic wave in the pipe 1. Therefore, if the frequency f and acoustic velocity v of the ultrasonic wave upon occurrence of resonance is found, the wall thickness d of the pipe 1 can be obtained.

Therefore, in the present embodiment, when measuring the wall thickness d of the pipe 1, the frequency of the ultrasonic wave is swept in a desired frequency range to measure a resonant frequency f. On the other hand, the acoustic velocity v can be calculated from the material of the pipe 1. Therefore, in the present embodiment, the measured resonant frequency f and the calculated acoustic velocity v can be used to derive the wall thickness d of the pipe 1.

For example, in a case of the pipe 1 made of steel having the wall thickness of 15 mm, if the ultrasonic wave of 200 kHz is input, resonance occurs. According to the present embodiment, if it is found that the pipe 1 is made of steel and the resonant frequency f is 200 kHz, the wall thickness d of the pipe 1 can be determined to be 15 mm.

The ultrasonic optical probe 5 in the present embodiment is desirably attached to portions which are statistically considered to be likely cause the pipe wall thinning, such as an elbow portion and a downstream side of an orifice portion of the pipe 1 in an atomic power station and a thermal power station, and portions which are likely to be obstructed, such as a pipe in a geothermal power station and the pipe 1 constituting a water pipe, or the like. The waveform signal generator 23 in the present embodiment is desirably configured such that a frequency of the vibration generated in the pipe 1 can be set to any frequency from 1 Hz to 10 MHz depending on the thickness of the pipe 1. The computer 7 in the present embodiment is desirably configured to be able to detect via the optical interferometer 22 not only an ultrasonic vibration of a frequency from 20 kHz to 10 MHz but also a non-ultrasonic vibration of a frequency from 1 Hz to 20 kHz.

FIG. 5 shows the second optical fiber 32. The first and second optical fibers 31 and 32 may have surfaces thereof exposed, be inserted between members of resin sheet or flexible sheet materials, or be constituted by combination of these. Gaps between the first and second optical fibers 31 and 32 and the members inserting these fibers may be filled with the adhesive.

(1) Pipe Inspecting Method of First Embodiment

Figure 6A:
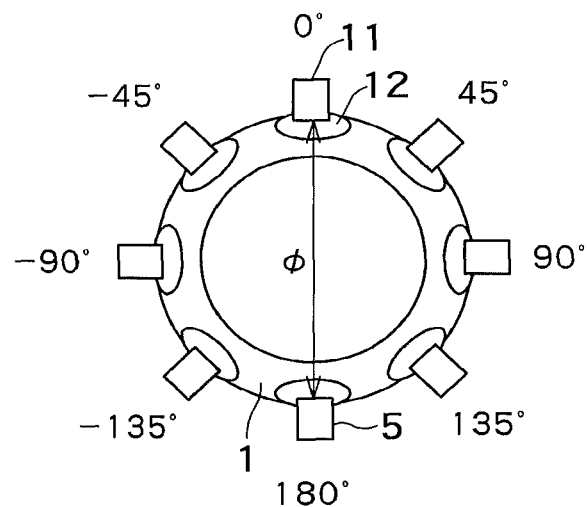
FIGS. 6A and 6B are a cross sectional view and a lateral view illustrating a pipe inspecting method of the first embodiment.
Figure 6B:
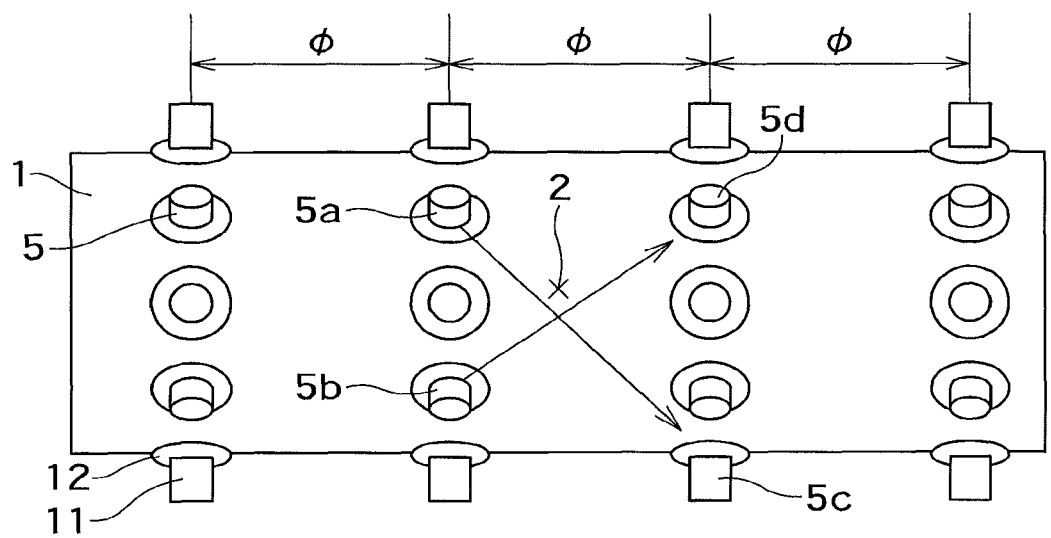

FIGS. 6A and 6B are a cross sectional view and a lateral view illustrating a pipe inspecting method of the first embodiment.

FIGS. 6A and 6B show a cross section and a lateral side of one spool of the pipe 1. Specifically, in compliance with the rules on thermal power generation facilities (JSME S CA1-2009) by the JSME, an example is shown in which four rows of the ultrasonic optical probes 5 are arranged on the pipe 1 having the size of 150 A or more. Each row has eight ultrasonic optical probes 5 at an equal interval. A distance between these rows is set to the same value as a diameter (outer diameter) ϕ of the pipe 1. In this example, 32 ultrasonic optical probes 5 are arranged on each spool of the pipe 1 in this way.

The pipe inspecting system in the present embodiment usually supplies the ultrasonic waves from the EMAT 11 to the optical fiber sensor 12 of the same ultrasonic optical probe 5 to detect the reference laser light transmitted through this optical fiber sensor 12 by the optical interferometer 22. In this case, the computer 7 can measure the wall thickness of the pipe 1 at the arranged position of this optical fiber sensor 12 (i.e., the wall thickness of the pipe 1 immediately below this optical fiber sensor 12).

Figure 1A:
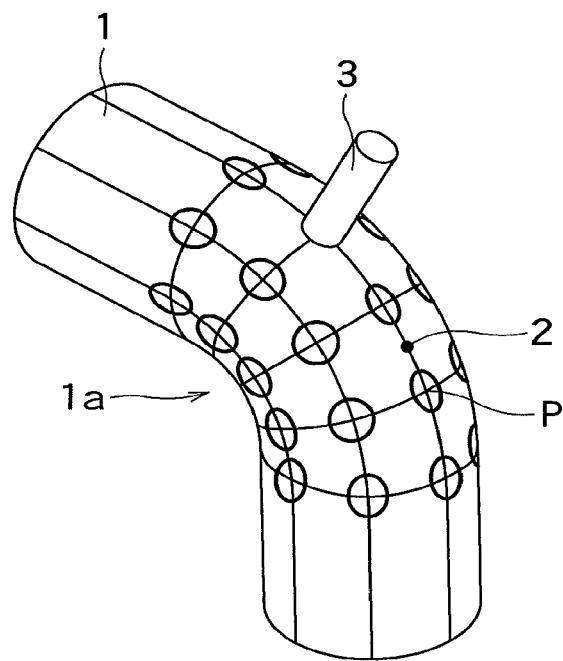
FIGS. 1A and 1B are perspective views illustrating a matrix fixed point method and a 3D-UT whole surface flaw detection method.
Figure 1B:
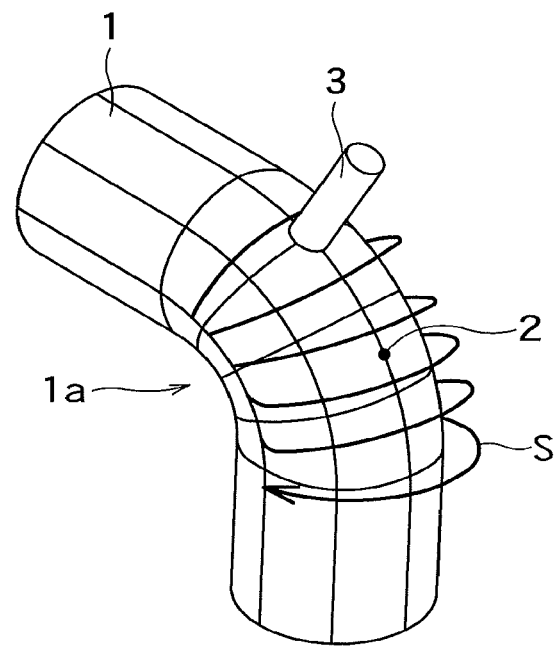
Figure 2:
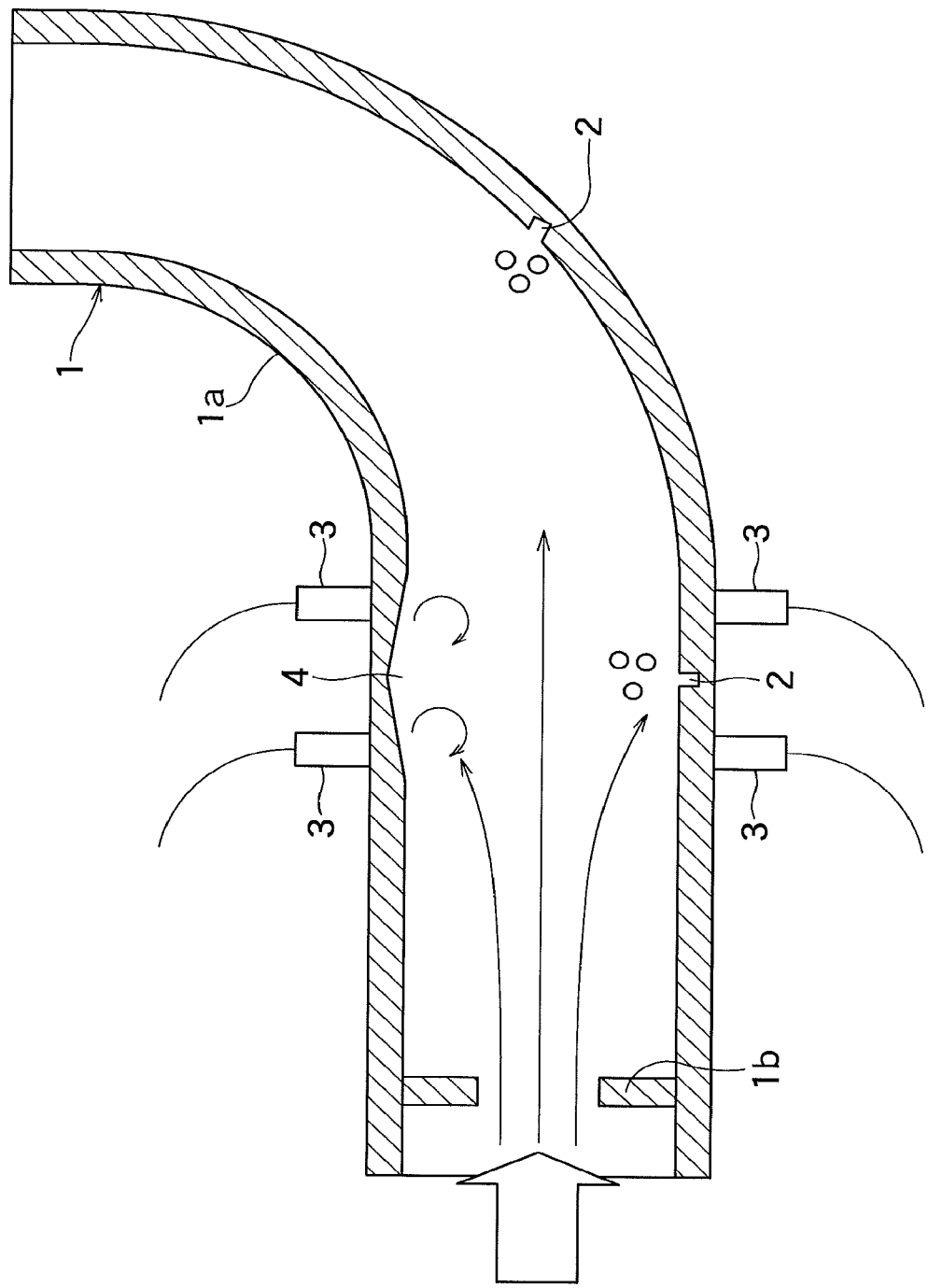
FIG. 2 is a sectional view illustrating a pipe wall thinning phenomenon.

The pipe inspecting system in the present embodiment can detect the FAC 4 (FIG. 2) in the pipe 1 by the measurement like this. In general, in performing the optical fiber EMAT method, an arrangement interval between the ultrasonic optical probes 5 is set a value with which the FAC 4 in the pipe 1 can be detected with a sufficient accuracy.

Moreover, the pipe inspecting system in the present embodiment can also supply the ultrasonic waves from the EMAT 11 to an optical fiber sensor 12 of a different ultrasonic optical probe 5 to detect the reference laser light transmitted through this optical fiber sensor 12 by the optical interferometer 22. In this case, the computer 7 can measure the wall thickness of the pipe 1 at a location other than the arranged position of this optical fiber sensor 12.

FIG. 6B shows an example in which the ultrasonic waves are supplied from an EMAT 11 of an ultrasonic optical probe 5a to an optical fiber sensor 12 of an ultrasonic optical probe 5c, and an example in which the ultrasonic waves are supplied from an EMAT 11 of an ultrasonic optical probe 5b to an optical fiber sensor 12 of an ultrasonic optical probe 5d. In the present embodiment, various combinations of the ultrasonic optical probe 5 (EMAT 11) sending the ultrasonic waves and the ultrasonic optical probe 5 (optical fiber sensor 12) receiving the ultrasonic waves are set such that the ultrasonic waves can be propagated through various routes. For example, various routes can be set such that these routes cover the surface of the pipe 1 in a netlike manner.

The pipe inspecting system in the present embodiment can detect the wall thinning and flaw in the pipe 1 at a location other than the arranged position of the ultrasonic optical probe 5 by the measurement like this. FIG. 6B shows a situation where the LDI 2 in the pipe 1 exists at such a location is detected.

This LDI 2, which exists near a route connecting the ultrasonic optical probes 5a and 5c by the shortest distance, can be detected by use of the ultrasonic waves supplied from EMAT 11 of the ultrasonic optical probe 5a to the optical fiber sensor 12 of the ultrasonic optical probe 5c. In addition, this LDI 2, which exists near a route connecting the ultrasonic optical probes 5b and 5d by the shortest distance, can be detected by use of the ultrasonic waves supplied from the EMAT 11 of the ultrasonic optical probe 5b to the optical fiber sensor 12 of the ultrasonic optical probe 5d.

In this way, the pipe inspecting system in the present embodiment can detect both the FAC 4 and LDI 2 in the pipe 1. The pipe inspecting system in the present embodiment switches over a combination of the ultrasonic optical probe 5 sending the ultrasonic waves and the ultrasonic optical probe 5 receiving the ultrasonic waves by the electrical switch 25 and the light switch 26 to be able to adjust a propagation route of the ultrasonic wave and detect the FAC 4 and LDI 2 at various locations in the pipe 1.

In the present embodiment, the ultrasonic waves are sent and received between the different ultrasonic optical probes 5. For this reason, it is desirable to increase an ultrasonic wave propagation distance of the EMAT 11 and an ultrasonic wave receiving area of the optical fiber sensor 12. Hereinafter, a description is specifically given of a method for increasing the ultrasonic wave propagation distance and the ultrasonic wave receiving area.

Figure 7A:
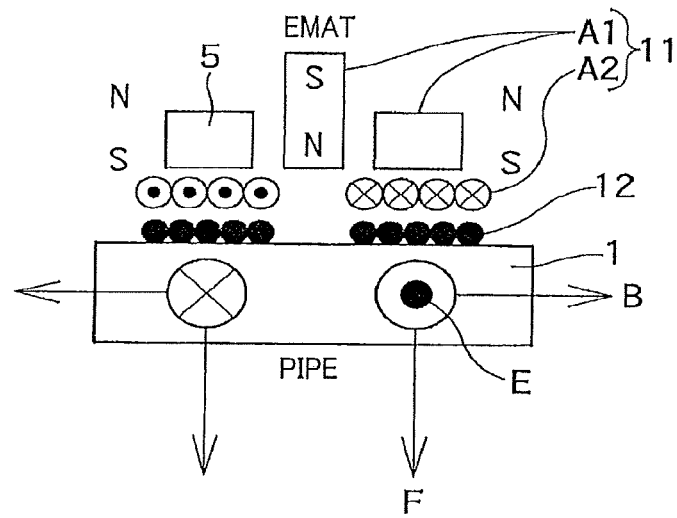
FIGS. 7A and 7B are sectional views illustrating a method for increasing an ultrasonic wave propagation distance of the first embodiment.
Figure 7B:
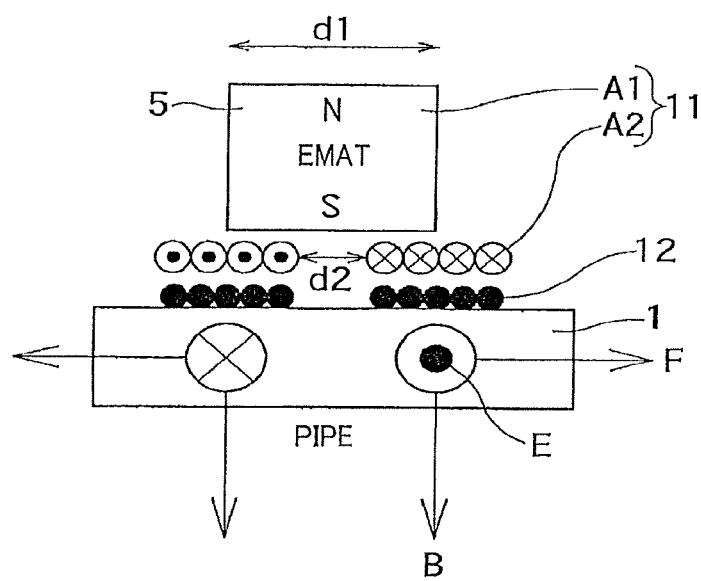

FIGS. 7A and 7B are sectional views illustrating a method for increasing the ultrasonic wave propagation distance of the first embodiment.

FIG. 7A is a sectional view showing a first example of the configuration of the ultrasonic optical probe 5.

The EMAT 11 in FIG. 7A includes two permanent magnets A1 and one electric coil A2. The electric coil A2 is wound in an annular shape. An outer diameter of the electric coil A2 is 15 mm, for example. One of the permanent magnets A1 is a magnet formed into a circular cylinder shape, and includes a north pole on a side of the electric coil A2 and a south pole on an opposite side to the electric coil A2. The other of the permanent magnets A1 is a magnet formed into a circular tube shape surrounding the circular-cylinder shaped magnet, and includes a south pole on a side of the electric coil A2 and a north pole on an opposite side to the electric coil A2. An outer diameter of the circular-tube shaped magnet is 20 mm, for example. The north pole and the south pole are examples of a first pole and a second pole, respectively.

In this way, these permanent magnets A1 have magnetizations whose directions are opposite to each other. Therefore, the EMAT 11 in FIG. 7A generates a magnetic field B vertical to a direction of the wall thickness of the pipe 1. Accordingly, there act on an electric charge in the pipe 1 a Lorentz force F vertical to an electric field E and the magnetic field B, that is, Lorentz force F parallel to the direction of the wall thickness of the pipe 1. A gap between these permanent magnets A1 may be an air gap or may be filled with a high magnetic permeability material such as an amorphous alloy.

In this way, the ultrasonic optical probe 5 in FIG. 7A can apply the magnetic field B vertical to the direction of the wall thickness of the pipe 1 to the pipe 1. The magnetic field B like this has an advantage that an S/N ratio of resonance can be increased in the direction of the wall thickness of the pipe 1, for example. Therefore, according to the configuration in FIG. 7A, a resonance signal of the EMAT 11 can be detected by the optical fiber sensor 12 apart from this EMAT 11. In an experiment, the resonance signal was detected between the ultrasonic optical probes 5 apart from each other by 2φ in the axial direction and by 180° in the circumferential direction.

FIG. 7B is a sectional view showing a second example of the configuration of the ultrasonic optical probe 5.

The EMAT 11 in FIG. 7B includes one permanent magnet A1 and one electric coil A2. The electric coil A2 is wound in an annular shape. An outer diameter of the electric coil A2 is 30 mm, for example. The permanent magnet A1 is a magnet formed into a circular cylinder shape having a diameter d1 larger than an inner diameter d2 of the electric coil A2. The diameter d1 of the permanent magnet A1 is 25 mm, for example. A thickness of the permanent magnet A1 is 5 mm, for example. The permanent magnet A1 includes a south pole on a side of the electric coil A2 and a north pole on an opposite side to the electric coil A2.

Therefore, the EMAT 11 in FIG. 7B generates the magnetic field B parallel to the direction of the wall thickness of the pipe 1. Accordingly, there act on the electric charge in the pipe 1 a Lorentz force F vertical to the electric field E and the magnetic field B, that is, Lorentz force F vertical to the direction of the wall thickness of the pipe 1.

In addition, the EMAT 11 in FIG. 7B includes a large permanent magnet A1 having the diameter d1 larger than the inner diameter d2 of the electric coil A2. The configuration like this has an advantage that the strength of the resonance signal of the EMAT 11 can be increased, for example.

Therefore, according to the configuration in FIG. 7B, the resonance signal of the EMAT 11 can be detected by the optical fiber sensor 12 apart from this EMAT 11.

In this way, in the present embodiment, it is desirable to use the EMAT (wide-area excitation EMAT) 11 capable of exciting the ultrasonic waves widely propagating in a direction parallel to the direction of the wall thickness of the pipe 1 as well as in a direction vertical to the direction of the wall thickness of the pipe 1.

Figure 8A:
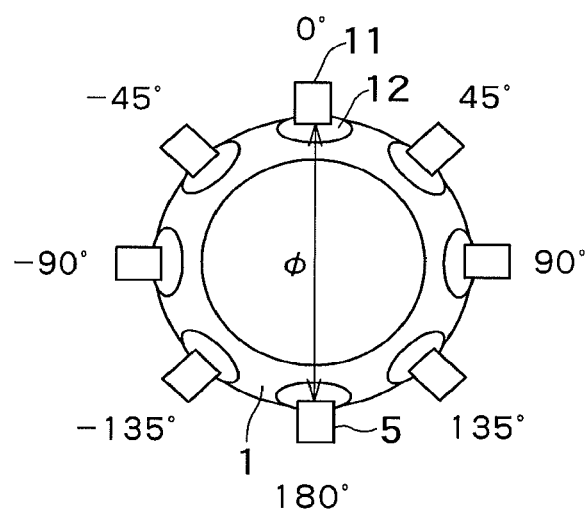
FIGS. 8A and 8B are a cross sectional view and a lateral view illustrating the pipe inspecting method of the first embodiment.
Figure 8B:
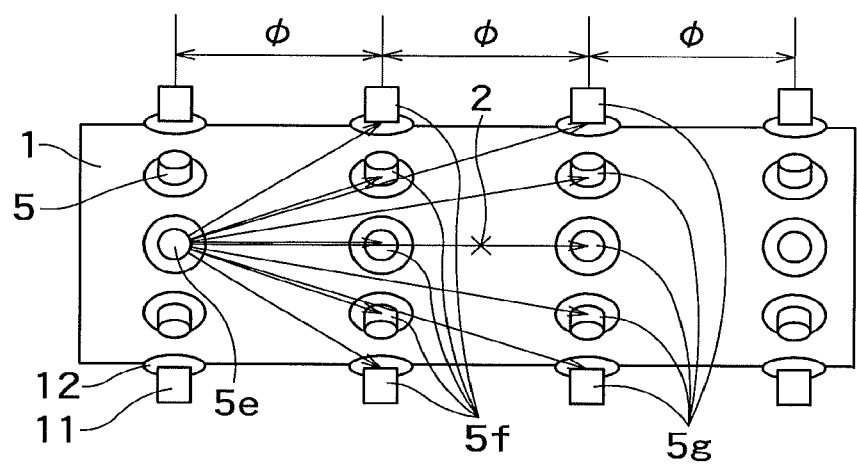

FIGS. 8A and 8B are a cross sectional view and a lateral view illustrating the pipe inspecting method of the first embodiment.

FIGS. 8A and 8B show a cross section and a lateral side of one spool of the pipe 1 similar to FIGS. 6A and 6B. However, FIGS. 8A and 8B show an example of the pipe inspecting method by use of the wide-area excitation EMAT 11.

In the present embodiment, the ultrasonic optical probe 5 including the wide-area excitation EMAT 11 is used to be able to send and receive the ultrasonic wave between the ultrasonic optical probes 5 apart from each other. FIG. 8B shows an example in which the ultrasonic waves are supplied from an ultrasonic optical probe 5e to an ultrasonic optical probe 5f in a row next to that of the ultrasonic optical probe 5e. FIG. 8B further shows an example in which the ultrasonic waves are supplied from the ultrasonic optical probe 5e to an ultrasonic optical probe 5g in a row next to that of the ultrasonic optical probe 5f. In this case, an LDI 2 existing between these rows can be detected, for example.

Further, in the present embodiment, the ultrasonic optical probe 5 including the wide-area excitation EMAT 11 can be used to decrease the number of the ultrasonic optical probes 5 on each spool. In FIGS. 8A and 8B, each spool has four rows of ultrasonic optical probes 5 arranged thereon, and each row has eight ultrasonic optical probes 5 arranged therein. Therefore, each spool has 32 ultrasonic optical probes 5.

However, in a case where the wide-area excitation EMAT 11 in the present embodiment is used, the resonance signal can be detected between the ultrasonic optical probes 5 apart from each other by 2φ in the axial direction and by 180° in the circumferential direction. Therefore, in the present embodiment, a configuration may be used in which each spool has two rows of ultrasonic optical probes 5 arranged thereon and each row has two ultrasonic optical probes 5 arranged therein. In this case, the number of the ultrasonic optical probes 5 on each spool can be decreased to ⅛ (from 32 pieces to 4 pieces).

According to the present embodiment, measurement accuracy for the wall thickness of the pipe 1 (for example, ±0.1 mm) is maintained while the number of the ultrasonic optical probes 5 arranged on the pipe 1 can be decreased. In the present embodiment, further increase of an ultrasonic wave propagation distance of the EMAT 11 may possibly allow the number of the ultrasonic optical probes 5 arranged on the pipe 1 to be further decreased.

However, since on the JSME rules, the EMAT 11 is required to oscillate on the matrix fixed points, the wide-area excitation EMATs 11 are arranged at 32 locations on each spool and the optical fiber sensors 12 are arranged at four locations on each spool described above to cover the wall thickness measurement all over the spool by the optical fiber sensors 12 arranged at these four locations in the present embodiment.

Figure 9:
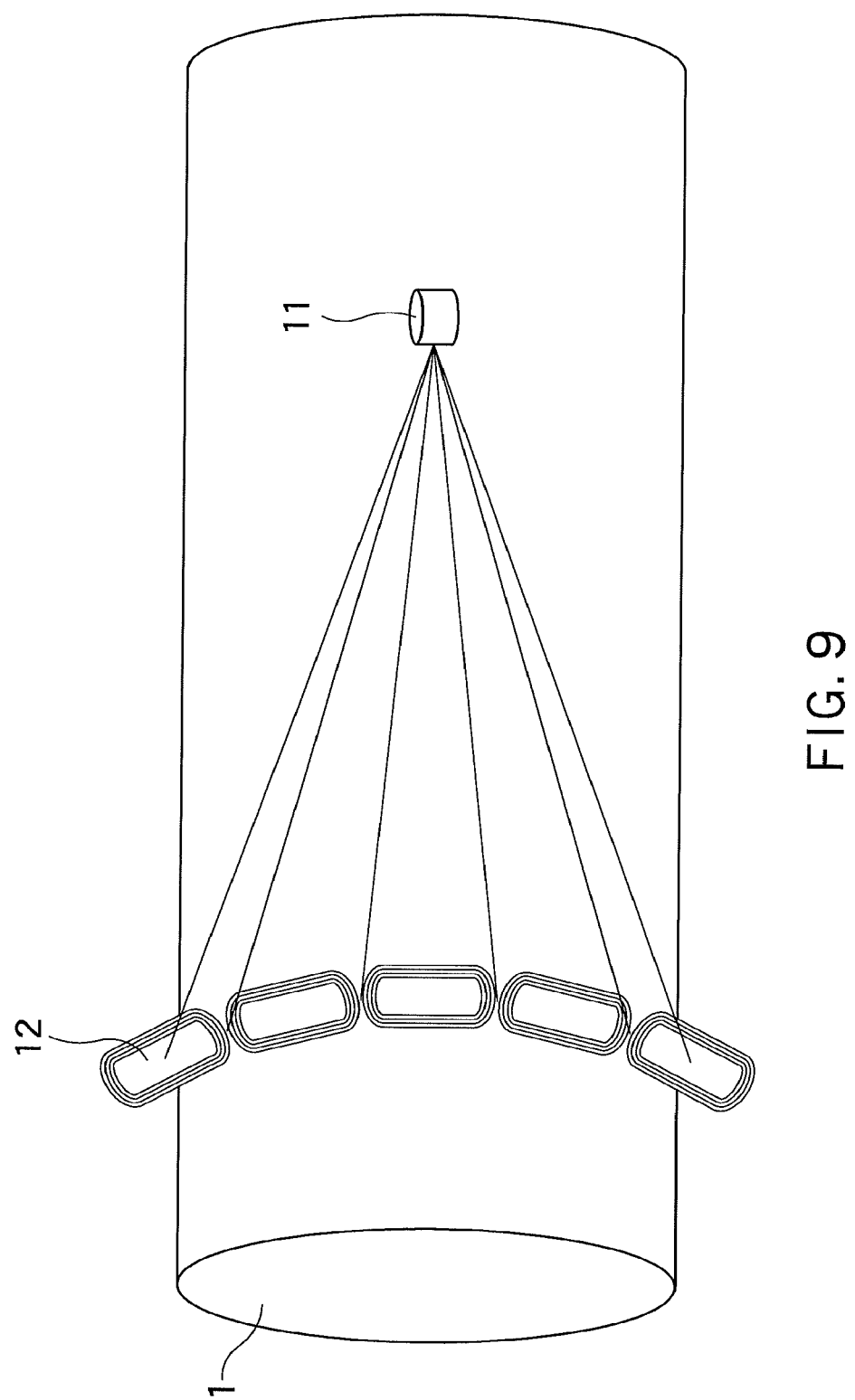
FIG. 9 is a lateral view illustrating a method for increasing an ultrasonic wave receiving area of the first embodiment.

FIG. 9 is a lateral view illustrating a method for increasing the ultrasonic wave receiving area of the first embodiment.

In the present embodiment, in order to increase a surface region of the pipe 1 covered by each optical fiber sensor 12, it is desirable to increase the winding number of each optical fiber sensor 12 or widen an area for each optical fiber sensor 12.

Accordingly, in the present embodiment, as shown in FIG. 9, the ultrasonic optical probes 5 each including an optical fiber sensor 12 wound in an ellipse shape may be used. In FIG. 9, the ultrasonic optical probes 5 are attached to form rings around the circumference of the pipe 1 with N ultrasonic optical probes 5 per ring where N is an integer of two or more. In FIG. 9, a value of N is eight. In FIG. 9, these ultrasonic optical probes 5 are attached to the pipe 1 in a manner that a long axis of the ellipse is parallel to the circumferential direction of the pipe 1. The N ultrasonic optical probes 5 are desirably attached to the pipe 1 such that the optical fiber sensors 12 are brought into contact with each other or are adjacent to each other.

According to the configuration in FIG. 9, an LDI covering ratio in each spool of the pipe 1 can be improved, for example, up to a value near 100% of LDI covering ratio. The LDI covering ratio is a ratio of a surface area of each spool in which the LDI 2 can be detected to a total surface area of each spool. A description is given of the LDI covering ratio in detail later.

A shape of each optical fiber sensor 12 in FIG. 9 is not required to be a mathematically-rigid ellipse, but may be sufficient so long as the shape has a long axial direction and a short axial direction and is recognizable as an ellipse. Actually, each optical fiber sensor 12 in FIG. 9 has a shape like that obtained by combining two straight lines and two 2 segments of arc. For example, the shape of each optical fiber sensor 12 may be an oval or an oblong.

In the present embodiment, instead of attaching the ultrasonic optical probe 5 including the EMAT 11 and the optical fiber sensor 12 to the pipe 1, the EMAT 11 and the optical fiber sensor 12 may be separated from each other and attached to the pipe 1. FIG. 9 shows the EMAT 11 and the optical fiber sensor 12 separated from the EMAT 11.

In this case, a plurality of EMATs 11 and a plurality of optical fiber sensors 12 separated from these EMATs 11 are attached to the pipe 1. The electrical switch 25 is used to select an EMAT 11 to be connected with the amplifier 24 from these EMATs 11. The EMAT 11 selected by the electrical switch 25 is an example of a first ultrasonic transducer. The light switch 26 is used to select an optical fiber sensor 12 to be connected with the optical interferometer 22 from these optical fiber sensors 12. The optical fiber sensor 12 selected by the light switch 26 is an example of a first optical fiber sensor. The configuration in which the EMAT 11 and the optical fiber sensor 12 are separated from each other may be also applied to, for example, LDI detection shown in FIGS. 11 to 16C.

Additionally, in the present embodiment, the ultrasonic optical probe 5 including the EMAT 11 and the optical fiber sensor 12 may be attached to the pipe 1 as well as the EMAT 11 and the optical fiber sensor 12 may be separated from each other and attached to the pipe 1 such that the EMATs 11 and the optical fiber sensors 12 of the former and the latter are used together.

FIGS. 10A and 10B are diagrams illustrating examples of configurations of the optical fiber sensor 12 of the first embodiment.

FIG. 10A shows the optical fiber sensor 12 having a configuration the same as the optical fiber sensor 12 in FIG. 3. The optical fiber sensor 12 in FIG. 10A has a first end B1 connected with the first optical fiber 31 and a second end B2 connected with the second optical fiber 32.

In the optical fiber sensor 12 in FIG. 10A, the reference laser light from the light source 21 is input via the first optical fiber 31 to the first end B1. At this time, in a state where the reference laser light is input to the optical fiber sensor 12, when the ultrasonic wave reaches the optical fiber sensor 12, a Doppler frequency shift and polarization plane variation are caused in the reference laser light.

This reference laser light travels through the optical fiber sensor 12 toward the second end B2, and is output from the second end B2 to be supplied via the second optical fiber 32 to the optical interferometer 22. The computer 7 can determine the state of the pipe 1 based on a detection result of the reference laser light by the optical interferometer 22.

On the other hand, FIG. 10B shows the optical fiber sensor 12 corresponding to a modification of the above. The optical fiber sensor 12 in FIG. 10B has the first end B1 connected with optical fiber 41 and the second end B2 connected with a reflection end 43 as an example of a reflection portion. The optical fiber 41 is connected via a circulator 42 to the first and second optical fibers 31 and 32. The circulator 42 is arranged for distinguishing incoming reference laser light and outgoing reference laser light from each other. An example of the circulator 42 is a polarizing plate. The reflection end 43 has a reflecting plane capable of reflecting the reference laser light.

In the optical fiber sensor 12 in FIG. 10B, the reference laser light from the light source 21 is input via the optical fibers 31 and 41 to the first end B1. At this time, in a state where the optical fiber sensor 12 is input to the reference laser light, when the ultrasonic wave reaches the optical fiber sensor 12, a Doppler frequency shift and polarization plane variation are caused in the reference laser light.

This reference laser light travels through the optical fiber sensor 12 toward the second end B2, reflected on the reflecting plane of the reflection end 43, and returned through the optical fiber sensor 12 toward the first end B1. This reference laser light is output from the first end B1 to be supplied via the optical fibers 41 and 32 to the optical interferometer 22. The computer 7 can determine the state of the pipe 1 based on a detection result of the reference laser light by the optical interferometer 22.

The pipe inspecting system in the present embodiment can use both the optical fiber sensor 12 in FIG. 10A and the optical fiber sensor 12 in FIG. 10B. For this reason, the pipe inspecting apparatus 6 in the present embodiment includes the mode switch 27 which switches between a double-lined mode for using the optical fiber sensor 12 in FIG. 10A and a single-lined mode for using the optical fiber sensor 12 in FIG. 10B (see FIG. 3). The double-lined mode and the single-lined mode are examples of a first mode and a second mode, respectively.

In the single-lined mode in the present embodiment, the circulator 42 is used, for example. In the double-lined mode in the present embodiment, the circulator 42 is in a state of not being used, for example.

(2) LDI Detection in First Embodiment

Figure 11:
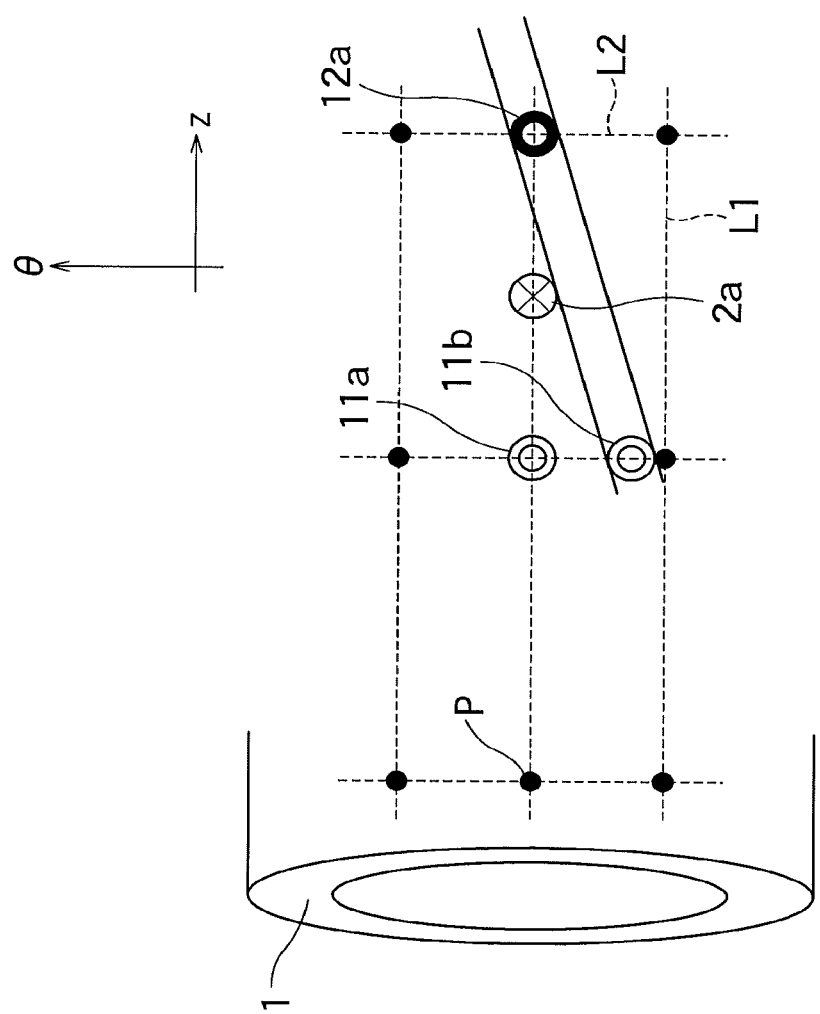
FIG. 11 is a diagram illustrating LDI detection in the first embodiment.

FIG. 11 is a diagram illustrating the LDI detection in the first embodiment.

The ultrasonic optical probes 5 in the present embodiment are attached at intersections P of a plurality of lines L1 extending in the axial direction (z direction) on the surface of the pipe 1 and a plurality of lines L2 extending in the circumferential direction (θ direction) on the surface of the pipe 1. The axial direction and the circumferential direction are examples of a first direction and a second direction, respectively. The lines L1 and L2 are examples of a first line and a second line, respectively. The intersection P corresponds to the measuring point in the matrix fixed point method.

FIG. 11 shows an EMAT 11a arranged at a certain intersection P, an optical fiber sensor 12a arranged at an intersection P next to the above intersection, and an LDI 2a existing on a line connecting the EMAT 11a to the optical fiber sensor 12a. FIG. 11 shows a situation of an experiment in which the EMAT 11a is moved in the circumferential direction by a predetermined distance, the ultrasonic waves are input from the moved EMAT 11a to the pipe 1, the reference laser light transmitted through the optical fiber sensor 12a is detected, and the LDI 2a is detected from a detection result of this reference laser light. The EMAT 11b indicates the moved EMAT 11a. In this experiment, not the wide-area excitation EMAT 11 but the usual EMAT 11 was used.

Figure 12:
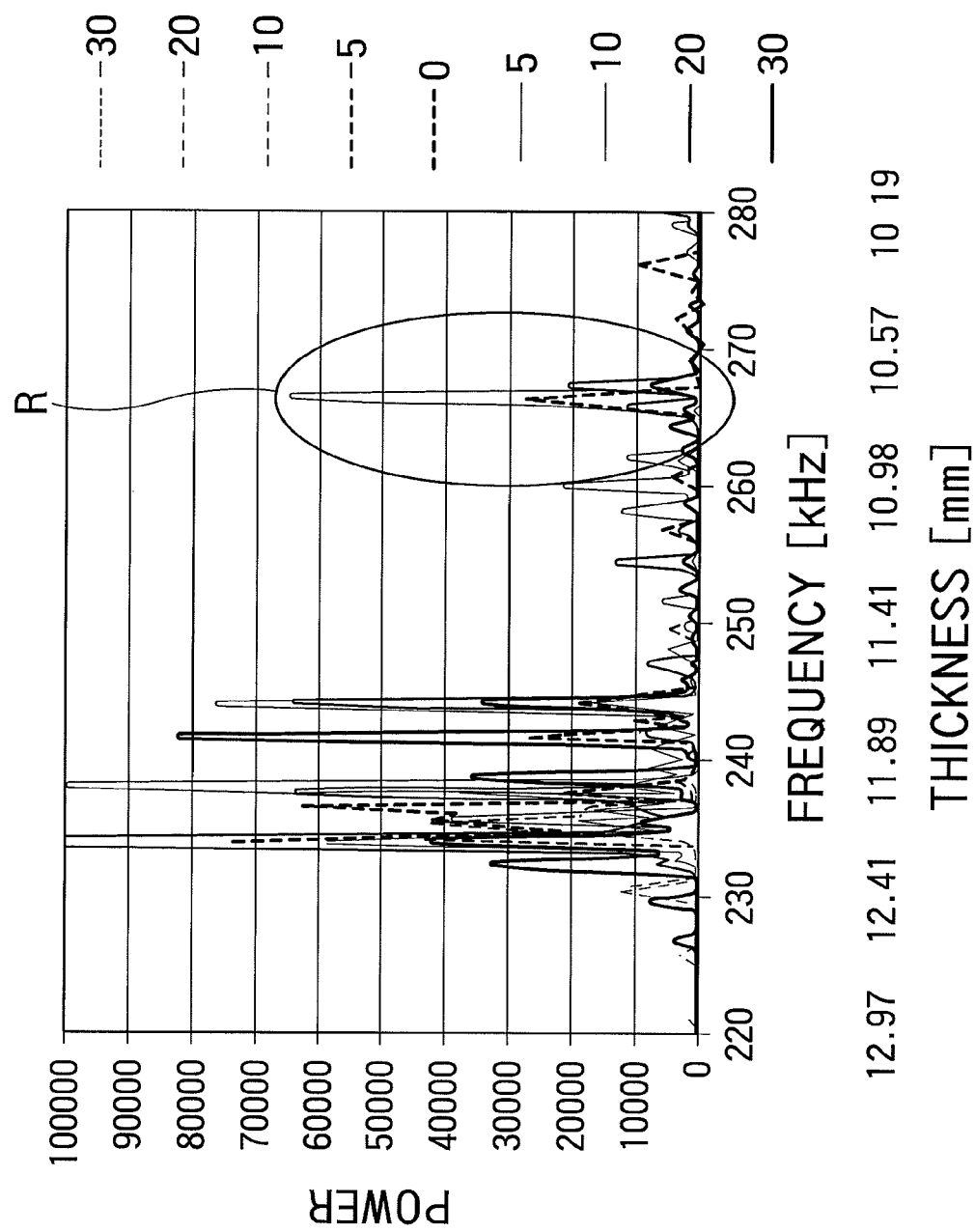
FIG. 12 is a graph illustrating the LDI detection in the first embodiment.

FIG. 12 is a graph illustrating the LDI detection in the first embodiment.

FIG. 12 shows a result of the experiment in FIG. 11. FIG. 12 shows a strength of the detected reference laser light for each frequency component. The frequency of the reference laser light corresponds to the wall thickness of the pipe 1 as shown in FIG. 12. A value for each curved line in FIG. 12 represents a moved distance (mm) of the EMAT 11a.

In this experiment, the pipe 1 having the wall thickness of 11.82 mm was used. A round R in FIG. 12 indicates a detection result of the LDI 2a. From this result, the wall thickness of the pipe 1 at the LDI 2a is found to be 10.71 mm. The LDI 2a causes the pipe wall thinning of the pipe 1 by 1.11 mm.

Figure 13:
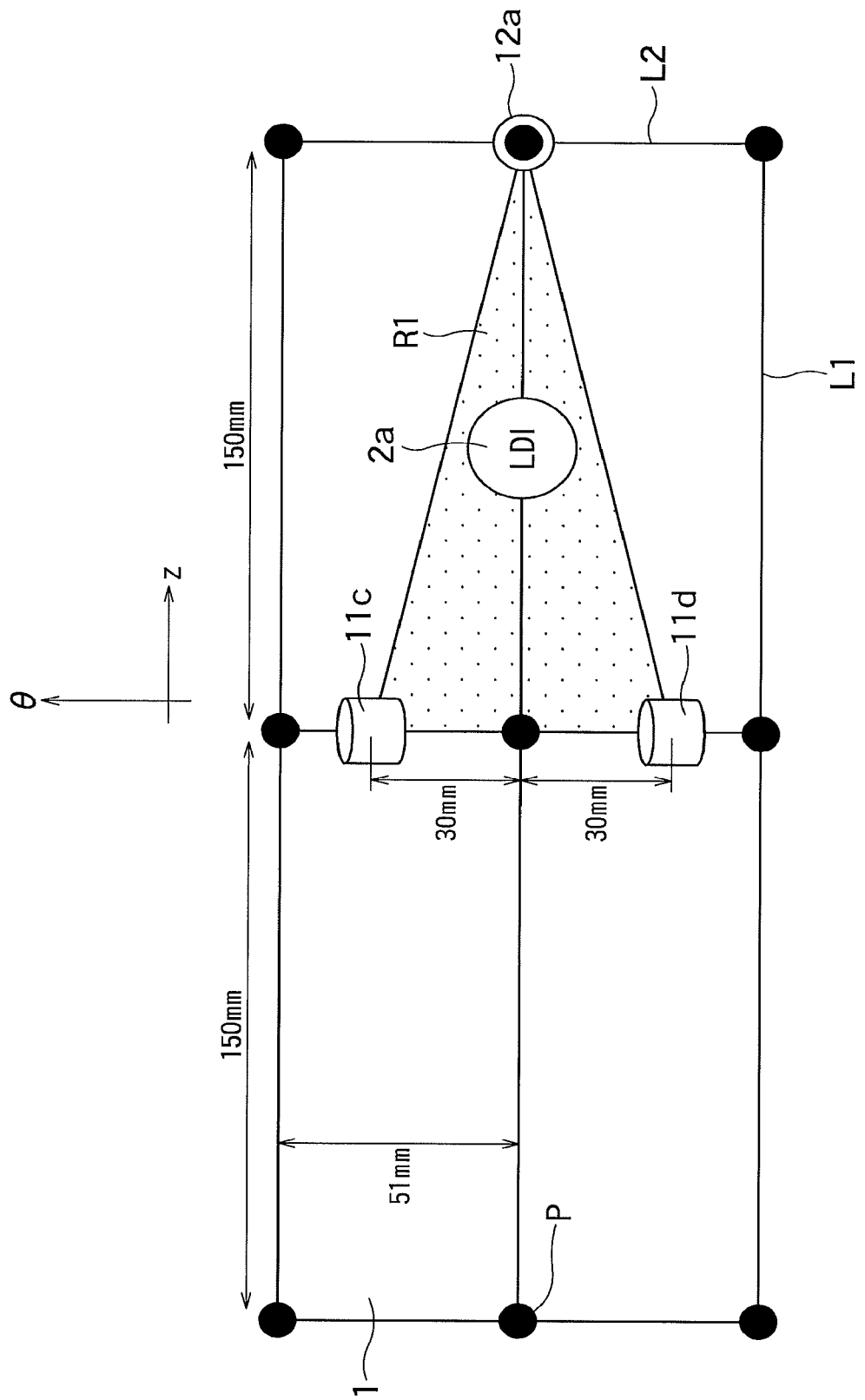
FIG. 13 is a diagram illustrating an LDI detection area in the first embodiment.

FIG. 13 is a diagram illustrating an LDI detection area in the first embodiment.

According to the graph in FIG. 12, if the moved distance of the EMAT 11a is 30 mm or less in the ±θ direction, the LDI 2a can be detected. The EMAT 11c or 11d represents the EMAT 11a after being moved by 30 mm in the ±θ direction. When the EMATs 11c and 11d are used, the LDI 2a can be detected. On the other hand, if the moved distance of the EMAT 11a exceeds 30 mm in the ±θ direction, the LDI 2a cannot be detected. Therefore, in the experiment in FIG. 11, the LDI 2 existing in an area R1 in FIG. 13 is found to be detectable. The area R1 is referred to as the LDI detection area.

In a case where the same ultrasonic optical probes 5 as in the experiment in FIG. 11 are used, even if the detection of the LDI 2 is repeated with setting of various combinations of the ultrasonic optical probe 5 sending the ultrasonic waves (EMAT 11) and the ultrasonic optical probe 5 receiving the ultrasonic waves (optical fiber sensor 12), the LDI 2 out of a predetermined area cannot be detected. In other words, in this case, the LDI covering ratio for each spool of the pipe 1 cannot be 100%. The LDI covering ratio is a ratio of a surface area of each spool in which the LDI 2 can be detected to a total surface area of each spool.

Figure 14:
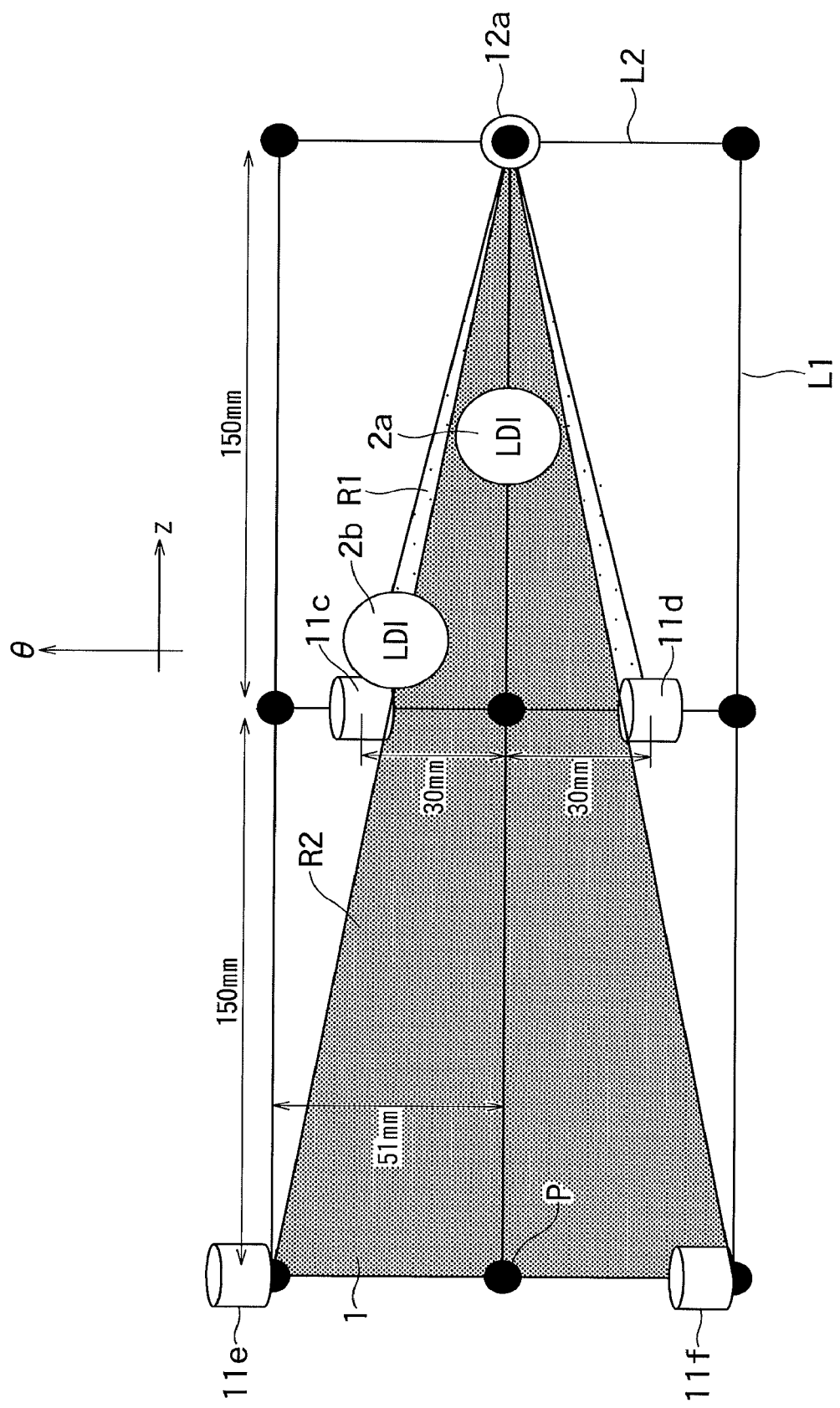
FIG. 14 is a diagram illustrating the LDI detection in the first embodiment.

FIG. 14 is a diagram illustrating the LDI detection in the first embodiment.

In the LDI detection in FIG. 14, the ultrasonic optical probe 5 including the wide-area excitation EMAT 11 in FIG. 7A or FIG. 7B is used. Therefore, the resonance signal can be detected between the ultrasonic optical probes 5 apart from each other by 2φ in the axial direction and by 180° in the circumferential direction.

FIG. 14 shows an EMAT 11e arranged at an intersection P corresponding to a location of the EMAT 11a in FIG. 11 after being moved by −φ in the axial direction and by +45° in the circumferential direction and an EMAT 11f arranged at an intersection P corresponding to a location of the EMAT 11a in FIG. 11 after being moved by −ϕ in the axial direction and by −45° in the circumferential direction. Therefore, the EMATs 11e and 11f are apart from the optical fiber sensor 12a at an interval of two lines L2 in the axial direction and at an interval of one line L1 in the circumferential direction. FIG. 14 further shows an LDI 2b existing on a line connecting the EMAT 11e to the optical fiber sensor 12a.

Since the EMATs 11e and 11f are each the wide-area excitation EMAT 11, the resonance signal can be detected between the EMATs 11e and 11f and the optical fiber sensor 12a. Therefore, in the LDI detection in FIG. 14, an area R2 is the LDI detection area and the LDI 2 existing in the area R2 can be detected. The area R2 is an isosceles triangle with a base of 102 mm and a height of 150 mm (however, this is a triangle not on a flat surface but on a curved surface). The LDI detection in FIG. 14 can detect the LDI 2a and the LDI 2b.

Accordingly, the pipe inspecting system in the present embodiment sets, in setting various combinations of the ultrasonic optical probe 5 sending the ultrasonic waves and the ultrasonic optical probe 5 receiving the ultrasonic waves, various combinations of the ultrasonic optical probes 5 part from each other at an interval of two lines L2 in the axial direction and at an interval of one line L1 in the circumferential direction. Examples of such a combination include a combination of the ultrasonic optical probe 5 including the EMAT 11e and the ultrasonic optical probe 5 including the optical fiber sensor 12a and a combination of the ultrasonic optical probe 5 including the EMAT 11f and the ultrasonic optical probe 5 including the optical fiber sensor 12a.

In a case where the LDI 2 detection is repeated by use of these combinations, if the LDI detection areas for the respective detections are overlaid, each spool of the pipe 1 can be fully covered by many LDI detection areas congruent to the area R2. This means that the LDI 2 in an entire area of each spool can be detected and the LDI covering ratio for each spool reaches 100%. Therefore, according to the present embodiment, the LDI 2 in the pipe 1 can be detected across the entire area of each spool with high accuracy. The LDI covering ratio for each spool is an example of a covering ratio in the wall thickness measurement for each spool (ratio of a surface area capable of undergoing the wall thickness measurement to a total surface area of each spool).

The pipe inspecting system in the present embodiment may set a combination of the ultrasonic optical probes 5 other than that as in FIG. 14 so long as the LDI covering ratio for each spool reaches 100%.

The reference laser light in the LDI detection for each combination is detected by the optical interferometer 22 and a detection result of the reference laser light is provided to the computer 7. The computer 7 calculates an attenuation ratio of the ultrasonic wave based on a detection result of the reference laser light. This attenuation ratio is a ratio of an amplitude of the ultrasonic wave generated from the EMAT 11 to an amplitude of the ultrasonic wave calculated from the reference laser light. The computer 7 can calculate, based on the attenuation ratio, a distance between an occurrence location of the pipe wall thinning in the pipe 1 (occurrence location of the LDI 2) and the ultrasonic optical probe 5 on the receiving side. The computer 7 may calculate, based on two attenuation ratios calculated from two combinations, a position of the occurrence location of the pipe wall thinning in the pipe 1 (occurrence location of the LDI 2).

Figure 15:
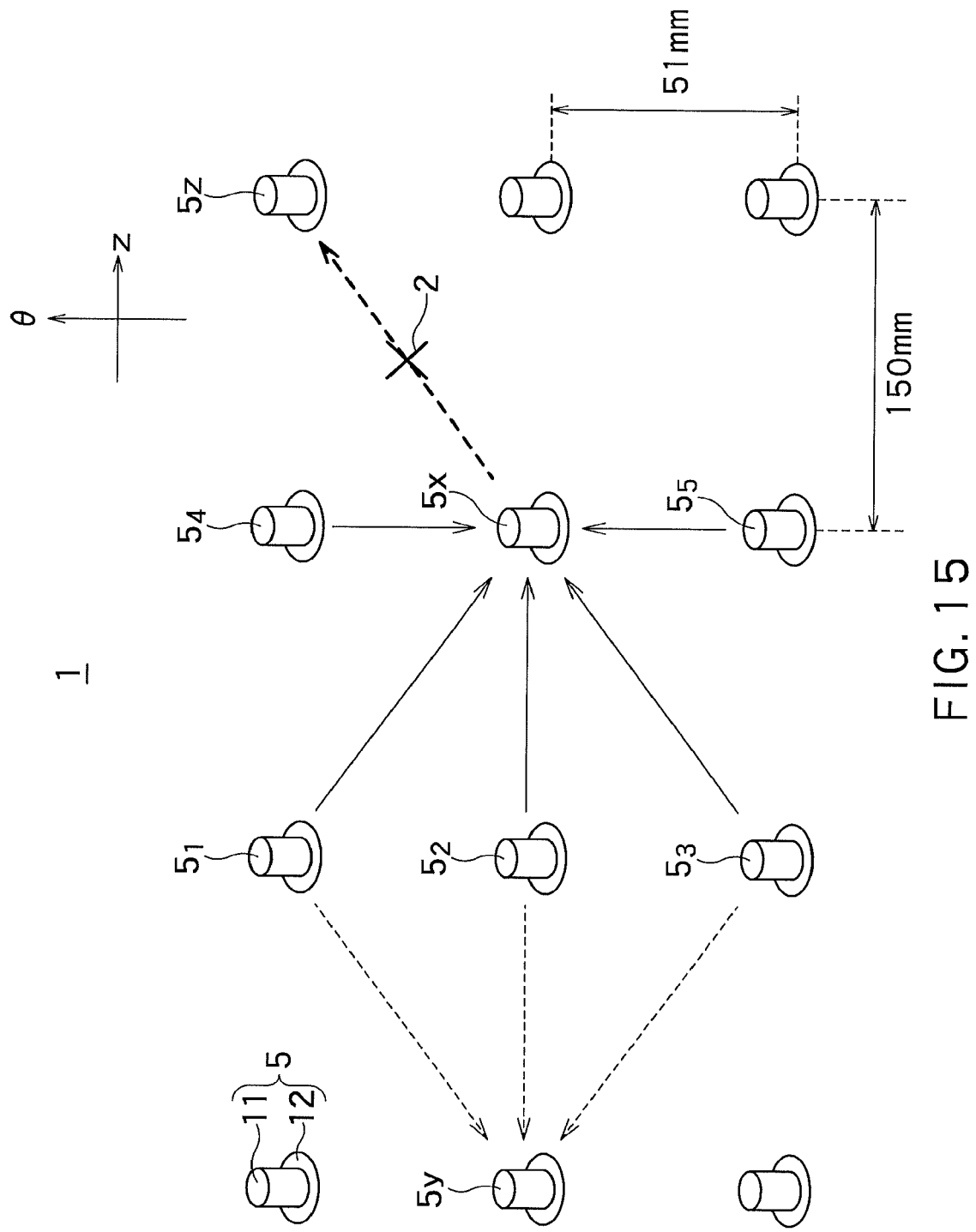
FIG. 15 is a diagram illustrating the LDI detection in a modification of the first embodiment.

FIG. 15 is a diagram illustrating the LDI detection in a modification of the first embodiment.

FIG. 15 shows a situation in which the ultrasonic optical probes $5_1$ to $5_5$ are simultaneously supplied with power, and the ultrasonic optical probe $5x$ receives the ultrasonic waves sent from the ultrasonic optical probes $5_1$ to $5_5$. The ultrasonic optical probes $5_1$ to $5_5$ are positioned in different directions with respect to the ultrasonic optical probe $5x$. Specifically, the ultrasonic optical probes $5_4$ and $5_5$ are positioned in the circumferential direction of the ultrasonic optical probe $5x$ (±θ direction). The ultrasonic optical probe $5_2$ is positioned in the axial direction of the ultrasonic optical probe $5x$ (−z direction). The ultrasonic optical probes $5_1$ and $5_3$ are positioned in a helical direction of the ultrasonic optical probe $5x$.

In the present modification, even if ultrasonic waves from the individual ultrasonic optical probes $5_1$ to $5_5$ are weak, the ultrasonic optical probe $5x$ can receive the ultrasonic waves which are composited into strong composite ultrasonic waves. Therefore, according to the present modification, accuracy of the LDI detection can be improved. In this case, the ultrasonic optical probes $5_1$ to $5_5$ are examples of a plurality of first ultrasonic optical probe, and the ultrasonic optical probe $5x$ is an example of one or more second ultrasonic optical probes.

FIG. 15 further shows a situation in which the ultrasonic optical probe $5x$ and the ultrasonic optical probe $5y$ receive the ultrasonic waves sent from the ultrasonic optical probes $5_1$ to $5_3$.

In the present modification, the reference laser light from the light source 21 is simultaneously supplied to the ultrasonic optical probes $5x$ and $5y$, and the reference laser light output from the ultrasonic optical probe $5x$ and the reference laser light output from the ultrasonic optical probe $5y$ are simultaneously detected by optical interferometer 22. Therefore, according to the present modification, the detection by two ultrasonic optical probes $5x$ and $5y$ can be conducted in a short time. Further, according to the present modification, the detection of the reference laser light from two ultrasonic optical probes $5x$ and $5y$ enables estimation of a shape and position of the LDI 2, as described later. In this case, the ultrasonic optical probes $5_1$ to $5_3$ are examples of one or more first ultrasonic optical probes, and the ultrasonic optical probes $5x$ and $5y$ are examples of a plurality of second ultrasonic optical probes.

FIG. 15 further shows a situation in which the ultrasonic optical probe $5z$ receives the ultrasonic waves sent from the ultrasonic optical probe $5x$. The LDI 2 shown in FIG. 15 exists on a line connecting the ultrasonic optical probes $5x$ and $5z$. Since the ultrasonic optical probe $5z$ is adjacent to the ultrasonic optical probe $5x$ in the helical direction of the ultrasonic optical probe $5x$, a distance between the ultrasonic optical probes $5x$ and $5z$ is longer than a diameter ϕ of the pipe 1 (=150 mm). Therefore, when the ultrasonic waves from the ultrasonic optical probe $5x$ are weak, the LDI 2 shown in FIG. 15 may possibly not be detected by the ultrasonic optical probe $5z$.

Accordingly, in the present modification, the EMATs 11 of the ultrasonic optical probes $5_1$ to $5_5$ are operated such that phases of the ultrasonic waves from the ultrasonic optical probes $5_1$ to $5_5$ are aligned at the position of the ultrasonic optical probe $5x$, and an amplitude of a composite ultrasonic wave of these ultrasonic waves is amplified at the position of the ultrasonic optical probe $5x$. Further, in the present modification, the EMAT 11 of the ultrasonic optical probe $5x$ is operated such that a phase of the ultrasonic wave from the ultrasonic optical probe $5x$ is aligned with the phase of this composite ultrasonic wave at the position of the ultrasonic optical probe $5x$, and the ultrasonic waves from the ultrasonic optical probe $5x$ are amplified by this composite ultrasonic waves. Therefore, according to the present modification, the strong ultrasonic waves can be propagated on a line connecting the ultrasonic optical probes $5x$ and $5z$, enabling improvement of detection accuracy of the LDI 2. According to the present modification, the detection is also enabled in a high order mode, which allows reliability of the LDI detection to be improved.

A positional relationship between the ultrasonic optical probes $5x$ and $5z$ may be set to a positional relationship different from the positional relationship in FIG. 15. The combination of the ultrasonic optical probes 5 for supplying the ultrasonic waves to the ultrasonic optical probe $5x$ may be other combination than the ultrasonic optical probes $5_1$ to $5_5$. In the present modification, it may be allowed that various positional relationships between the ultrasonic optical probes $5x$ and $5z$ and various combinations of the ultrasonic optical probes 5 for supplying the ultrasonic waves to the ultrasonic optical probe $5x$ are set, under these settings, behaviors of the reference laser light are investigated in a case where the LDI 2 exists on a line connecting the ultrasonic optical probes $5x$ and $5z$, and a result of this investigation is held in the computer 7 as a database. This allows the computer 7 to easily detect the LDI 2 by comparing the database with a detection result of the reference laser light from the ultrasonic optical probe $5z$. The database may include, for example, data for estimating the shape and position of the LDI 2, as described later.

Figure 16A:
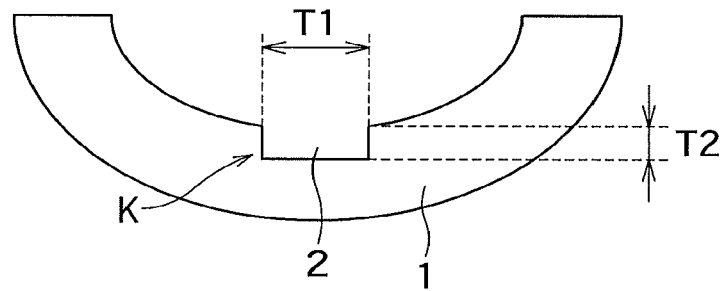
FIGS. 16A to 16C are sectional views illustrating several kinds of an LDI in the first embodiment.
Figure 16B:
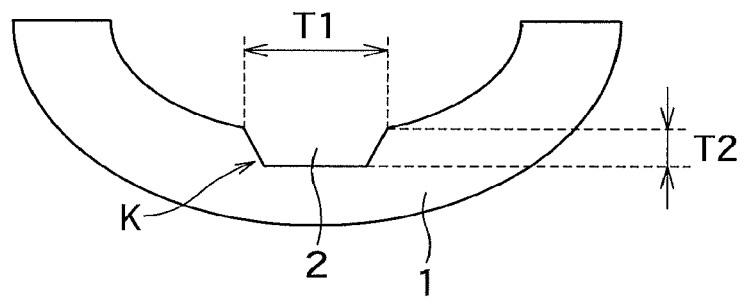
Figure 16C:
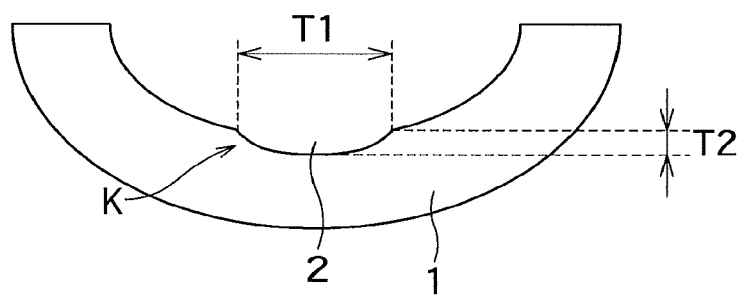

FIGS. 16A to 16C are sectional views illustrating several kinds of the LDI 2 in the first embodiment.

FIGS. 16A to 16C each show the LDI 2 occurring in the pipe 1. Reference character T1 denotes a diameter of the LDI 2. The diameter T1 of the LDI 2 is about 20 to 30 mm, for example. Reference character T2 denotes a depth of the LDI 2. The depth T2 of the LDI 2 is about 2 mm, for example.

Reference character K denotes a corner portion between a bottom surface and a side surface of each LDI 2. The corner portion K of the LDI 2 in FIG. 16A has an angle of 90 degrees. The corner portion K of the LDI 2 in FIG. 16B has an angle larger than 90 degrees (for example, 135 degrees). The LDI 2 in FIG. 16C has the corner portion K whose border between the bottom surface and the side surface is unclear. In this way, FIGS. 16A to 16C show the LDIs 2 different in a shape of the corner portion K. Hereinafter, sectional shapes of the LDIs 2 in FIGS. 16A to 16C are referred to as an orthogonal shape, an obtuse shape, and a curved shape, respectively.

As a result of an experiment, it has been found that the ultrasonic wave is easy to transmit through the LDI 2 having the orthogonal shape, difficult to transmit through the LDI 2 having the curved shape, and further difficult to transmit through the LDI 2 having the obtuse shape. In other words, transmittance of the ultrasonic wave with respect to these LDIs 2 is the highest in the LDI 2 having the orthogonal shape and the lowest in the LDI 2 having the obtuse shape. However, the corner portion K of the LDI 2 having the obtuse shape was set to 135 degrees. Additionally, as a result of the experiment, it has been found that a transmittance of the ultrasonic wave in a case where the ultrasonic wave hits a certain LDI 2 in the axial direction is higher than a transmittance of the ultrasonic wave in a case where the ultrasonic wave hits this LDI 2 in the circumferential direction.

With taking into account these experiment results, if a difference is ignorable between the transmittances of the ultrasonic waves in the axial direction and the circumferential direction, when the ultrasonic wave hits the LDI 2 having the orthogonal shape, a transmitted wave having a strong strength and a reflected wave having a weak strength are assumed to be observed. On the other hand, when the ultrasonic wave hits the LDI 2 having the obtuse shape, a transmitted wave having a weak strength and a reflected wave having a strong strength are assumed to be observed.

Accordingly, in the modification in FIG. 15, the computer 7 detects the transmitted wave and reflected wave in the ultrasonic waves based on a detection result of the reference laser light. Then, the computer 7 estimates the shape of the LDI 2 based on a ratio of the strength of the transmitted wave and the strength of the reflected wave. For example, if the ratio of the transmitted waves is higher than a first predetermined value, the LDI 2 is estimated to have the orthogonal shape. If the ratio of the transmitted waves is between the first predetermine value and a second predetermined value, the LDI 2 is estimated to have the curved shape. If the ratio of the transmitted waves is lower than the second predetermined value, the LDI 2 is estimated to have the obtuse shape.

For example, assume a case where the ultrasonic waves from the ultrasonic optical probe $5x$ are received by the ultrasonic optical probe $5z$ and the ultrasonic optical probe $5_4$. In this case, if the LDI 2 exists on a line connecting the ultrasonic optical probes $5x$ and $5z$, the reference laser light affected by the LDI 2 is detected at the ultrasonic optical probe $5z$ and the ultrasonic optical probe $5_4$, as shown in FIG. 15. In a case where the ultrasonic wave is detected from the reference laser light sent from the ultrasonic optical probe $5z$, this ultrasonic wave is generally considered to be the transmitted wave. On the other hand, in a case where the ultrasonic wave is detected from the reference laser light sent from the ultrasonic optical probe $5_4$, this ultrasonic wave is generally considered to be the reflected wave. In this case, the ratio of the strengths of the transmitted wave and the reflected wave generally conforms with a ratio of the strengths of the former ultrasonic wave and the latter ultrasonic wave. Therefore, based on a detection result of these ultrasonic waves, the ratio of the strengths of the transmitted wave and the reflected wave can be calculated, and based on this ratio, the shape of the LDI 2 can be estimated.

However, if a difference is not ignorable between the transmittances of the ultrasonic waves in the axial direction and the circumferential direction, when this transmittance difference is not taken into consideration, the shape of the LDI 2 may not be correctly estimated in some case. Accordingly, it may be allowed in the present modification that a table for estimating the shape of the LDI 2 from the above strength ratio is set with taking into consideration this transmittance difference, and the table is held as a database in the computer 7. In this case, using the table enables the shape of the LDI 2 to be more correctly estimated.

In addition, the computer 7 can estimate the position of the LDI 2 based on a propagation direction of the transmitted wave and a propagation direction of the reflected wave. For example, in a case where the ultrasonic waves from the ultrasonic optical probe $5x$ are received by the ultrasonic optical probe $5z$ and the ultrasonic optical probe $5_4$, the ultrasonic optical probe $5z$ can detect the propagation direction of the transmitted wave, and the ultrasonic optical probe $5_4$ can detect the propagation direction of the reflected wave. In this case, the computer 7 can draw a line from the ultrasonic optical probe $5z$ along the propagation direction of the transmitted wave and draw a line from the ultrasonic optical probe $5_4$ along the propagation direction of the reflected wave, and calculate an intersection of these lines to estimate the position of the LDI 2. The above database may also be used for estimating the position of the LDI 2.

As described above, in the present embodiment, the different ultrasonic optical probes 5 are selected as the ultrasonic optical probe 5 sending the ultrasonic waves and the ultrasonic optical probe 5 receiving the ultrasonic waves to be able to inspect the pipe 1. Therefore, according to the present embodiment, the inspection of the state of the pipe 1 is enabled at a location other than the arranged position of the ultrasonic optical probe 5.

While certain embodiments have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from the spirit of the inventions. The accompanying claims and their equivalents are intended to cover such forms or modifications as would fall within the scope and spirit of the inventions.

The invention claimed is:

1. A pipe inspecting apparatus comprising:
a selection module configured to select first and second ultrasonic optical probes from a plurality of ultrasonic optical probes attached at intersections of first lines extending in a first direction on a surface of a pipe and second lines extending in a second direction on the surface of the pipe, the selection module selecting, as the first and second ultrasonic optical probes, a combination of ultrasonic optical probes which are apart from each other at an interval of two second lines in the first direction and at an interval of one first line in the second direction;
a power supplying module configured to supply power to an ultrasonic transducer of the first ultrasonic optical probe to input an ultrasonic wave from the ultrasonic transducer to the pipe and to supply the ultrasonic wave via the pipe to an optical fiber sensor of the second ultrasonic optical probe; and
a light detection module configured to detect laser light transmitted through the optical fiber sensor of the second ultrasonic optical probe,
wherein
the selection module selects two first ultrasonic optical probes and one second ultrasonic optical probe from the plurality of ultrasonic optical probes, the two first ultrasonic optical probes being provided at a same position in the first direction and being apart from each other at an interval of two first lines in the second direction,
the power supplying module simultaneously supplies the power to ultrasonic transducers of the two first ultrasonic optical probes and controls the two first ultrasonic optical probes such that phases of ultrasonic waves from the two first ultrasonic optical probes are aligned at a position of the one second ultrasonic optical probe to input the ultrasonic waves from the ultrasonic transducers to the pipe and to supply the ultrasonic waves via the pipe to an optical fiber sensor of the one second ultrasonic optical probe, and
the light detection module detects the laser light transmitted through the optical fiber sensor of the one second ultrasonic optical probe.

2. The apparatus of claim 1, wherein at least one of the ultrasonic transducers includes: a coil configured to be supplied with the power, a first magnet including a first pole on a side of the coil and including a second pole on an opposite side to the coil, and a second magnet having a shape surrounding the first magnet, including the second pole on a side of the coil and including the first pole on an opposite side to the coil.

3. The apparatus of claim 1, wherein at least one of the ultrasonic transducers includes: a coil configured to be supplied with the power and wound in an annular shape, and a magnet formed into a circular cylinder shape and having a diameter larger than an inner diameter of the annular shape.

4. The apparatus of claim 1, wherein each of the ultrasonic optical probes includes an optical fiber sensor wound in an ellipse shape.

5. The apparatus of claim 4, wherein the ultrasonic optical probes are attached to form rings around a circumference of the pipe with N ultrasonic optical probes per circle where N is an integer of two or more, and are attached to the pipe such that a long axis of the ellipse shape is parallel to a circumferential direction of the pipe.

6. The apparatus of claim 1, wherein the selection module sets a plurality of combinations of the first ultrasonic optical probe and the second ultrasonic optical probe, and the combinations are set such that a cover ratio in wall thickness measurement for each spool of the pipe reaches 100% by the wall thickness measurement using the combinations.

7. The apparatus of claim 1, wherein the selection module includes a first switch configured to select the first ultrasonic optical probe from the plurality of ultrasonic optical probes, and a second switch configured to select the second ultrasonic optical probe from the plurality of ultrasonic optical probes.

8. A pipe inspecting method comprising:
selecting first and second ultrasonic optical probes from a plurality of ultrasonic optical probes attached at intersections of first lines extending in a first direction on a surface of a pipe and second lines extending in a second direction on the surface of the pipe, the first and second ultrasonic optical probes being a combination of ultrasonic optical probes which are apart from each other at an interval of two second lines in the first direction and at an interval of one first line in the second direction;
supplying power to an ultrasonic transducer of the first ultrasonic optical probe to input an ultrasonic wave from the ultrasonic transducer to the pipe and to supply the ultrasonic wave via the pipe to an optical fiber sensor of the second ultrasonic optical probe; and
detecting laser light transmitted through the optical fiber sensor of the second ultrasonic optical probe,
wherein
the selecting includes selecting two first ultrasonic optical probes and one second ultrasonic optical probe from the plurality of ultrasonic optical probes, the two first ultrasonic optical probes being provided at a same position in the first direction and being apart from each other at an interval of two first lines in the second direction,
the supplying the power includes simultaneously supplying the power to ultrasonic transducers of the two first ultrasonic optical probes and controlling the two first ultrasonic optical probes such that phases of ultrasonic waves from the two first ultrasonic optical probes are aligned at a position of the one second ultrasonic optical probe to input the ultrasonic waves from the ultrasonic transducers to the pipe and to supply the ultrasonic waves via the pipe to an optical fiber sensor of the one second ultrasonic optical probe, and the detecting includes detecting the laser light transmitted through the optical fiber sensor of the one second ultrasonic optical probe.

9. The method of claim 8, further comprising:

calculating an attenuation ratio of the ultrasonic wave, based on a detection result of the laser light; and calculating a distance between an occurrence location of pipe wall thinning in the pipe and the second ultrasonic optical probe, based on the attenuation ratio of the ultrasonic wave.

10. The method of claim 8, further comprising:

detecting a transmitted wave and a reflected wave in the ultrasonic wave, based on a detection result of the laser light; and estimating a shape or position of the occurrence location of pipe wall thinning in the pipe, based on a detection result of the transmitted wave and the reflected wave.

* * * * *